United States Patent
Nixon et al.

(10) Patent No.: US 10,656,627 B2
(45) Date of Patent: **\*May 19, 2020**

(54) MANAGING BIG DATA IN PROCESS CONTROL SYSTEMS

(71) Applicant: FISHER-ROSEMOUNT SYSTEMS, INC., Round Rock, TX (US)

(72) Inventors: Mark J. Nixon, Round Rock, TX (US); Paul Richard Muston, Leicester (GB); Deji Chen, Travis, TX (US); Song Han, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,194

(22) Filed: Apr. 28, 2017

(65) Prior Publication Data

US 2017/0235298 A1    Aug. 17, 2017

Related U.S. Application Data

(62) Division of application No. 14/169,965, filed on Jan. 31, 2014, now Pat. No. 9,665,088.

(51) Int. Cl.
*G05B 19/418* (2006.01)
*G05B 23/02* (2006.01)

(52) U.S. Cl.
CPC ....... *G05B 19/418* (2013.01); *G05B 23/0264* (2013.01); *G05B 2219/31462* (2013.01)

(58) Field of Classification Search
CPC ............. G05B 19/418; G05B 23/0264; G05B 2219/31462
See application file for complete search history.

(56) References Cited

U.S. PATENT DOCUMENTS

| 4,451,047 A | 5/1984 | Herd et al. |
| 4,593,367 A | 6/1986 | Slack et al. |

(Continued)

FOREIGN PATENT DOCUMENTS

| AU | 2010257310 A1 | 7/2012 |
| CN | 1409179 A | 4/2003 |

(Continued)

OTHER PUBLICATIONS

Aouada et al., "Source Detection and Separation in Power Plant Process Monitoring: Application of the Bootstrap," IEEE International Conference on Acoustics Speech and Signal Processing Proceedings (2006).

(Continued)

*Primary Examiner* — Charles E Anya
(74) *Attorney, Agent, or Firm* — Marshall, Gerstein & Borun LLP

(57) ABSTRACT

A big data network or system for a process control system or plant includes a data storage device configured to receive process control data from control system devices and store the process control data. The big data network or system identifies various parameters or attributes from the process control data, and creates and uses rowkeys to store the parameters according to various combinations, such as combinations using timestamps. The big data network or system may also store certain aggregate data analyses associated with time periods specified by the timestamps. Accordingly, the big data network or system efficiently stores real-time data having measurements within a database schema, and users or administrators can leverage the aggregate data to analyze certain data associated with certain time periods.

20 Claims, 13 Drawing Sheets

(56) References Cited

U.S. PATENT DOCUMENTS

| | | |
|---|---|---|
| 4,901,221 A | 2/1990 | Kodosky et al. |
| 4,914,568 A | 4/1990 | Kodosky et al. |
| 5,111,531 A | 5/1992 | Grayson et al. |
| 5,164,897 A | 11/1992 | Clark et al. |
| 5,291,587 A | 3/1994 | Kodosky et al. |
| 5,301,301 A | 4/1994 | Kodosky et al. |
| 5,301,336 A | 4/1994 | Kodosky et al. |
| 5,475,851 A | 12/1995 | Kodosky et al. |
| 5,481,740 A | 1/1996 | Kodosky |
| 5,481,741 A | 1/1996 | McKaskle et al. |
| 5,497,500 A | 3/1996 | Rogers et al. |
| 5,544,320 A | 8/1996 | Konrad |
| 5,568,491 A | 10/1996 | Beal et al. |
| 5,598,572 A | 1/1997 | Tanikoshi et al. |
| 5,610,828 A | 3/1997 | Kodosky et al. |
| 5,652,909 A | 7/1997 | Kodosky |
| D384,050 S | 9/1997 | Kodosky |
| D384,051 S | 9/1997 | Kodosky |
| D384,052 S | 9/1997 | Kodosky |
| D387,750 S | 12/1997 | Kodosky |
| 5,710,723 A | 1/1998 | Hoth et al. |
| 5,732,277 A | 3/1998 | Kodosky et al. |
| 5,734,863 A | 3/1998 | Kodosky et al. |
| 5,737,622 A | 4/1998 | Rogers et al. |
| 5,801,942 A | 9/1998 | Nixon et al. |
| 5,801,946 A | 9/1998 | Nissen et al. |
| 5,821,934 A | 10/1998 | Kodosky et al. |
| 5,828,851 A | 10/1998 | Nixon et al. |
| 5,838,563 A | 11/1998 | Dove et al. |
| 5,856,931 A | 1/1999 | McCasland |
| 5,862,052 A | 1/1999 | Nixon et al. |
| 5,862,054 A | 1/1999 | Li |
| 5,909,368 A | 6/1999 | Nixon et al. |
| 5,917,489 A | 6/1999 | Thurlow et al. |
| 5,940,294 A | 8/1999 | Dove |
| 5,971,747 A | 10/1999 | Lemelson et al. |
| 5,980,078 A | 11/1999 | Krivoshein et al. |
| 5,987,246 A | 11/1999 | Thomsen et al. |
| 5,988,847 A | 11/1999 | McLaughlin et al. |
| 5,990,906 A | 11/1999 | Hudson et al. |
| 5,995,916 A | 11/1999 | Nixon et al. |
| 6,009,422 A | 12/1999 | Ciccarelli |
| 6,032,208 A | 2/2000 | Nixon et al. |
| 6,064,409 A | 5/2000 | Thomsen et al. |
| 6,078,320 A | 6/2000 | Dove et al. |
| 6,098,116 A | 8/2000 | Nixon et al. |
| 6,167,464 A | 12/2000 | Kretschmann |
| 6,173,438 B1 | 1/2001 | Kodosky et al. |
| 6,178,504 B1 | 1/2001 | Fieres et al. |
| 6,195,591 B1 | 2/2001 | Nixon et al. |
| 6,219,628 B1 | 4/2001 | Kodosky et al. |
| 6,266,726 B1 | 7/2001 | Nixon et al. |
| 6,278,374 B1 | 8/2001 | Ganeshan |
| 6,285,966 B1 | 9/2001 | Brown et al. |
| 6,295,513 B1 | 9/2001 | Thackston |
| 6,324,877 B2 | 12/2001 | Neeley |
| 6,347,253 B1 | 2/2002 | Fujita et al. |
| 6,421,570 B1 | 7/2002 | McLaughlin et al. |
| 6,442,515 B1 | 8/2002 | Varma et al. |
| 6,463,352 B1 | 10/2002 | Tadokoro et al. |
| 6,529,780 B1 | 3/2003 | Soergel et al. |
| 6,535,883 B1 | 3/2003 | Lee et al. |
| 6,563,430 B1 | 5/2003 | Kemink et al. |
| 6,584,601 B1 | 6/2003 | Kodosky et al. |
| 6,608,638 B1 | 8/2003 | Kodosky et al. |
| 6,609,036 B1 | 8/2003 | Bickford |
| 6,658,114 B1 | 12/2003 | Farn et al. |
| 6,701,285 B2 | 3/2004 | Salonen |
| 6,715,078 B1 | 3/2004 | Chasko et al. |
| 6,715,139 B1 | 3/2004 | Kodosky et al. |
| 6,763,515 B1 | 7/2004 | Vazquez et al. |
| 6,768,116 B1 | 7/2004 | Berman et al. |
| 6,772,017 B1 | 8/2004 | Dove et al. |
| 6,778,873 B1 | 8/2004 | Wang et al. |
| 6,784,903 B2 | 8/2004 | Kodosky et al. |
| 6,847,850 B2 | 1/2005 | Grumelart |
| 6,868,538 B1 | 3/2005 | Nixon et al. |
| 6,917,839 B2 | 7/2005 | Bickford |
| 6,934,667 B2 | 8/2005 | Kodosky et al. |
| 6,934,668 B2 | 8/2005 | Kodosky et al. |
| 6,954,724 B2 | 10/2005 | Kodosky et al. |
| 6,961,686 B2 | 11/2005 | Kodosky et al. |
| 6,965,886 B2 | 11/2005 | Govrin et al. |
| 6,970,758 B1 | 11/2005 | Shi et al. |
| 6,971,066 B2 | 11/2005 | Schultz et al. |
| 6,983,228 B2 | 1/2006 | Kodosky et al. |
| 6,993,466 B2 | 1/2006 | Kodosky et al. |
| 7,000,190 B2 | 2/2006 | Kudukoli et al. |
| 7,006,881 B1 | 2/2006 | Hoffberg et al. |
| 7,010,470 B2 | 3/2006 | Kodosky et al. |
| 7,062,718 B2 | 6/2006 | Kodosky et al. |
| 7,072,722 B1 | 7/2006 | Colonna et al. |
| 7,123,974 B1 | 10/2006 | Hamilton |
| 7,134,086 B2 | 11/2006 | Kodosky |
| 7,134,090 B2 | 11/2006 | Kodosky et al. |
| 7,143,149 B2 | 11/2006 | Oberg et al. |
| 7,143,289 B2 | 11/2006 | Denning et al. |
| 7,177,786 B2 | 2/2007 | Kodosky et al. |
| 7,185,287 B2 | 2/2007 | Ghercioiu et al. |
| 7,200,838 B2 | 4/2007 | Kodosky et al. |
| 7,210,117 B2 | 4/2007 | Kudukoli et al. |
| 7,213,057 B2 | 5/2007 | Trethewey et al. |
| 7,216,334 B2 | 5/2007 | Kodosky et al. |
| 7,219,306 B2 | 5/2007 | Kodosky et al. |
| 7,222,131 B1 | 5/2007 | Grewal et al. |
| 7,283,914 B2 | 10/2007 | Poorman et al. |
| 7,283,971 B1 | 10/2007 | Levine et al. |
| 7,302,675 B2 | 11/2007 | Rogers et al. |
| 7,314,169 B1 | 1/2008 | Jasper et al. |
| 7,340,737 B2 | 3/2008 | Ghercioiu et al. |
| 7,343,605 B2 | 3/2008 | Langkafel et al. |
| 7,346,404 B2 | 3/2008 | Eryurek et al. |
| 7,367,028 B2 | 4/2008 | Kodosky et al. |
| 7,478,337 B2 | 1/2009 | Kodosky et al. |
| 7,506,304 B2 | 3/2009 | Morrow et al. |
| 7,530,052 B2 | 5/2009 | Morrow et al. |
| 7,530,113 B2 | 5/2009 | Braun |
| 7,536,548 B1 | 5/2009 | Batke et al. |
| RE40,817 E | 6/2009 | Krivoshein et al. |
| 7,541,920 B2 | 6/2009 | Tambascio et al. |
| 7,548,873 B2 | 6/2009 | Veeningen et al. |
| 7,558,711 B2 | 7/2009 | Kodosky et al. |
| 7,565,306 B2 | 7/2009 | Apostolides |
| 7,574,690 B2 | 8/2009 | Shah et al. |
| 7,594,220 B2 | 9/2009 | Kodosky et al. |
| 7,598,856 B1 | 10/2009 | Nick et al. |
| 7,606,681 B2 | 10/2009 | Esmaili et al. |
| 7,616,095 B2 | 11/2009 | Jones et al. |
| 7,617,542 B2 | 11/2009 | Vataja |
| 7,627,860 B2 | 12/2009 | Kodosky et al. |
| 7,630,914 B2 | 12/2009 | Veeningen et al. |
| 7,640,007 B2 | 12/2009 | Chen et al. |
| 7,644,052 B1 | 1/2010 | Chang et al. |
| 7,650,264 B2 | 1/2010 | Kodosky et al. |
| 7,653,563 B2 | 1/2010 | Veeningen et al. |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |
| RE41,228 E | 4/2010 | Kodosky et al. |
| 7,694,273 B2 | 4/2010 | Kodosky et al. |
| 7,707,014 B2 | 4/2010 | Kodosky et al. |
| 7,715,929 B2 | 5/2010 | Skourup et al. |
| 7,716,489 B1 | 5/2010 | Brandt et al. |
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |
| 7,831,914 B2 | 11/2010 | Kodosky et al. |
| 7,844,908 B2 | 11/2010 | Kodosky et al. |
| 7,853,431 B2 | 12/2010 | Samardzija et al. |
| 7,865,349 B2 | 1/2011 | Kodosky et al. |
| 7,882,490 B2 | 2/2011 | Kodosky et al. |
| 7,882,491 B2 | 2/2011 | Kodosky et al. |

(56) References Cited

U.S. PATENT DOCUMENTS

| | | |
|---|---|---|
| 7,890,461 B2 | 2/2011 | Oeda et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,937,665 B1 | 5/2011 | Vazquez et al. |
| 7,962,440 B2 | 6/2011 | Baier et al. |
| 7,978,059 B2 | 7/2011 | Petite et al. |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 | 5/2012 | Clark et al. |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Musti et al. |
| 8,239,848 B2 | 8/2012 | Ghercioiu et al. |
| 8,266,066 B1 | 9/2012 | Wezter et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,532,795 B2 | 9/2013 | Adavi et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,886,598 B1 | 11/2014 | Emigh |
| 8,943,469 B2 | 1/2015 | Kumar et al. |
| 8,977,851 B2 | 3/2015 | Neitzel et al. |
| 9,002,973 B2 | 4/2015 | Panther |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,764 B2 | 9/2015 | Neitzel et al. |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,244,452 B2 | 1/2016 | Brandes et al. |
| 9,285,795 B2 | 3/2016 | Nixon et al. |
| 9,338,218 B1 | 5/2016 | Florissi et al. |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,466,038 B2 | 10/2016 | Kezeu |
| 9,516,354 B1 | 12/2016 | Verheem et al. |
| 9,532,232 B2 | 12/2016 | Dewey et al. |
| 9,541,905 B2 | 1/2017 | Nixon et al. |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 | 7/2017 | Nixon et al. |
| 9,804,588 B2 | 10/2017 | Blevins et al. |
| 9,892,353 B1 | 2/2018 | Lui et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0077711 A1 | 6/2002 | Nixon et al. |
| 2002/0080174 A1 | 6/2002 | Kodosky et al. |
| 2002/0087419 A1 | 7/2002 | Andersson et al. |
| 2002/0094085 A1 | 7/2002 | Roberts |
| 2002/0120475 A1 | 8/2002 | Morimoto |
| 2002/0123864 A1 | 9/2002 | Eryurek et al. |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 | 10/2002 | Travaly et al. |
| 2002/0169514 A1 | 11/2002 | Eryurek et al. |
| 2002/0188366 A1* | 12/2002 | Pepper ............ G06Q 10/06 700/108 |
| 2002/0194112 A1 | 12/2002 | dePinto et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0037119 A1 | 2/2003 | Austin |
| 2003/0061295 A1 | 3/2003 | Oberg et al. |
| 2003/0083756 A1 | 5/2003 | Hsiung et al. |
| 2003/0084053 A1 | 5/2003 | Govrin et al. |
| 2003/0093309 A1 | 5/2003 | Tanikoshi et al. |
| 2003/0147351 A1 | 8/2003 | Greenlee |
| 2003/0154044 A1 | 8/2003 | Lundstedt et al. |
| 2003/0195934 A1 | 10/2003 | Peterson et al. |
| 2004/0005859 A1 | 1/2004 | Ghercioiu et al. |
| 2004/0012632 A1 | 1/2004 | King et al. |
| 2004/0014479 A1 | 1/2004 | Milman |
| 2004/0075689 A1 | 4/2004 | Schleiss et al. |
| 2004/0093102 A1 | 5/2004 | Liiri et al. |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |
| 2004/0186927 A1 | 9/2004 | Eryurek et al. |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2004/0259533 A1 | 12/2004 | Nixon et al. |
| 2005/0005259 A1 | 1/2005 | Avery et al. |
| 2005/0007249 A1 | 1/2005 | Eryurek et al. |
| 2005/0033481 A1 | 2/2005 | Budhraja et al. |
| 2005/0049835 A1 | 3/2005 | Mayer et al. |
| 2005/0060111 A1 | 3/2005 | Ramillon et al. |
| 2005/0062677 A1 | 3/2005 | Nixon et al. |
| 2005/0080799 A1 | 4/2005 | Harnden et al. |
| 2005/0096872 A1 | 5/2005 | Blevins et al. |
| 2005/0130634 A1 | 6/2005 | Godfrey |

(56) References Cited

U.S. PATENT DOCUMENTS

| | | |
|---|---|---|
| 2005/0164684 A1 | 7/2005 | Chen et al. |
| 2005/0182650 A1 | 8/2005 | Maddox et al. |
| 2005/0187649 A1 | 8/2005 | Funk et al. |
| 2005/0197806 A1 | 9/2005 | Eryurek et al. |
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0161394 A1 | 7/2006 | Dulberg et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0235741 A1 | 10/2006 | Deaton et al. |
| 2006/0241792 A1 | 10/2006 | Pretlove et al. |
| 2006/0288091 A1 | 12/2006 | Oh et al. |
| 2006/0288330 A1 | 12/2006 | Bahrami et al. |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheidt et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0112574 A1 | 5/2007 | Greene |
| 2007/0118516 A1 | 5/2007 | Li et al. |
| 2007/0130310 A1 | 6/2007 | Batke et al. |
| 2007/0130572 A1* | 6/2007 | Gilbert .............. G06F 9/4488 719/318 |
| 2007/0132779 A1 | 6/2007 | Gilbert et al. |
| 2007/0139441 A1 | 6/2007 | Lucas et al. |
| 2007/0142936 A1 | 6/2007 | Denison et al. |
| 2007/0168060 A1 | 7/2007 | Nixon et al. |
| 2007/0179645 A1 | 8/2007 | Nixon et al. |
| 2007/0185754 A1 | 8/2007 | Schmidt |
| 2007/0211079 A1 | 9/2007 | Nixon et al. |
| 2007/0239292 A1 | 10/2007 | Ehrman et al. |
| 2007/0250292 A1 | 10/2007 | Alagappan et al. |
| 2007/0265801 A1 | 11/2007 | Foslien et al. |
| 2007/0265866 A1 | 11/2007 | Fehling et al. |
| 2008/0040719 A1 | 2/2008 | Shimizu et al. |
| 2008/0046104 A1 | 2/2008 | Van Camp et al. |
| 2008/0058968 A1 | 3/2008 | Sharma et al. |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1 | 3/2008 | Fletcher et al. |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0085682 A1 | 4/2008 | Rao |
| 2008/0086428 A1 | 4/2008 | Wallace |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0114710 A1 | 5/2008 | Pucher |
| 2008/0125912 A1 | 5/2008 | Heilman et al. |
| 2008/0126352 A1 | 5/2008 | Case |
| 2008/0126408 A1 | 5/2008 | Middleton |
| 2008/0126665 A1 | 5/2008 | Burr et al. |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0249641 A1 | 10/2008 | Enver et al. |
| 2008/0274766 A1 | 11/2008 | Pratt et al. |
| 2008/0275971 A1 | 11/2008 | Pretlove et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0048853 A1 | 2/2009 | Hall |
| 2009/0049073 A1 | 2/2009 | Cho |
| 2009/0059814 A1 | 3/2009 | Nixon et al. |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089233 A1 | 4/2009 | Gach et al. |
| 2009/0089247 A1* | 4/2009 | Blevins .............. G06Q 10/00 |
| 2009/0089359 A1 | 4/2009 | Siorek et al. |
| 2009/0089709 A1 | 4/2009 | Baier et al. |
| 2009/0094531 A1 | 4/2009 | Danieli et al. |
| 2009/0097502 A1 | 4/2009 | Yamamoto |
| 2009/0112335 A1 | 4/2009 | Mehta et al. |
| 2009/0112532 A1* | 4/2009 | Foslien .............. G05B 15/02 703/2 |
| 2009/0210386 A1 | 8/2009 | Cahill |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0284348 A1 | 11/2009 | Pfeffer |
| 2009/0284383 A1 | 11/2009 | Wiles et al. |
| 2009/0292514 A1 | 11/2009 | McKim et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2009/0327014 A1 | 12/2009 | Labedz et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0082132 A1 | 4/2010 | Marruchella et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0222899 A1 | 9/2010 | Blevins et al. |
| 2010/0234969 A1* | 9/2010 | Inoue .............. C23C 14/54 700/12 |
| 2010/0262929 A1 | 10/2010 | Avery |
| 2010/0275135 A1 | 10/2010 | Dunton et al. |
| 2010/0286798 A1 | 11/2010 | Keyes et al. |
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0299105 A1 | 11/2010 | Vass et al. |
| 2010/0305736 A1 | 12/2010 | Arduini |
| 2010/0318934 A1 | 12/2010 | Blevins et al. |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0072338 A1 | 3/2011 | Caldwell |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1* | 6/2011 | Firkins .............. G05B 23/027 700/80 |
| 2011/0191277 A1 | 8/2011 | Ag ndez Dominguez et al. |
| 2011/0238189 A1 | 9/2011 | Butera et al. |
| 2011/0258138 A1 | 10/2011 | Kulkarni et al. |
| 2011/0270855 A1 | 11/2011 | Antonysamy |
| 2011/0276896 A1 | 11/2011 | Zambetti et al. |
| 2011/0276908 A1 | 11/2011 | O'Riordan |
| 2011/0279323 A1 | 11/2011 | Hung et al. |
| 2011/0282793 A1 | 11/2011 | Mercuri et al. |
| 2011/0282836 A1 | 11/2011 | Erickson et al. |
| 2011/0295578 A1 | 12/2011 | Aldrich et al. |
| 2011/0295722 A1 | 12/2011 | Reisman |
| 2012/0004743 A1 | 1/2012 | Anne et al. |
| 2012/0005270 A1 | 1/2012 | Harding et al. |

(56) References Cited

U.S. PATENT DOCUMENTS

| | | |
|---|---|---|
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0203728 A1 | 8/2012 | Levine |
| 2012/0226985 A1 | 9/2012 | Chervets et al. |
| 2012/0230309 A1 | 9/2012 | Junk |
| 2012/0239164 A1 | 9/2012 | Smith et al. |
| 2012/0249588 A1 | 10/2012 | Tison et al. |
| 2012/0259436 A1 | 10/2012 | Resurreccion et al. |
| 2012/0271962 A1 | 10/2012 | Ivanov et al. |
| 2012/0290795 A1 | 11/2012 | Dowlatkhah |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0060354 A1* | 3/2013 | Choi ................. G05B 19/41875 700/51 |
| 2013/0086591 A1 | 4/2013 | Haven |
| 2013/0095849 A1 | 4/2013 | Pakzad |
| 2013/0120449 A1 | 5/2013 | Ihara et al. |
| 2013/0127980 A1 | 5/2013 | Haddick et al. |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0151563 A1 | 6/2013 | Addepalli et al. |
| 2013/0159200 A1 | 6/2013 | Paul et al. |
| 2013/0166542 A1 | 6/2013 | Kulkarni et al. |
| 2013/0169526 A1 | 7/2013 | Gai et al. |
| 2013/0171599 A1 | 7/2013 | Bleich et al. |
| 2013/0184847 A1 | 7/2013 | Fruh et al. |
| 2013/0197954 A1 | 8/2013 | Yankelevich et al. |
| 2013/0211555 A1 | 8/2013 | Lawson et al. |
| 2013/0212129 A1 | 8/2013 | Lawson et al. |
| 2013/0214902 A1 | 8/2013 | Pineau et al. |
| 2013/0217417 A1 | 8/2013 | Mohideen et al. |
| 2013/0231947 A1 | 9/2013 | Shusterman |
| 2013/0257627 A1 | 10/2013 | Rafael |
| 2013/0265857 A1 | 10/2013 | Foulds et al. |
| 2013/0282150 A1 | 10/2013 | Panther et al. |
| 2013/0318536 A1 | 11/2013 | Fletcher et al. |
| 2014/0006338 A1 | 1/2014 | Watson et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0079297 A1 | 3/2014 | Tadayon et al. |
| 2014/0089504 A1 | 3/2014 | Scholz et al. |
| 2014/0108985 A1 | 4/2014 | Scott et al. |
| 2014/0122026 A1 | 5/2014 | Aberg et al. |
| 2014/0122806 A1 | 5/2014 | Lin et al. |
| 2014/0123115 A1 | 5/2014 | Peretz |
| 2014/0123276 A1 | 5/2014 | Bush et al. |
| 2014/0129002 A1 | 5/2014 | Brandes et al. |
| 2014/0136652 A1 | 5/2014 | Narayanaswami et al. |
| 2014/0156032 A1 | 6/2014 | Jenkins et al. |
| 2014/0164603 A1 | 6/2014 | Castel et al. |
| 2014/0172961 A1 | 6/2014 | Clemmer et al. |
| 2014/0180671 A1 | 6/2014 | Osipova |
| 2014/0180970 A1 | 6/2014 | Hettenkofer et al. |
| 2014/0189520 A1 | 7/2014 | Crepps et al. |
| 2014/0201244 A1 | 7/2014 | Zhou |
| 2014/0207415 A1 | 7/2014 | Bhutani et al. |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0282722 A1 | 9/2014 | Kummer et al. |
| 2014/0297225 A1 | 10/2014 | Petroski et al. |
| 2014/0303754 A1 | 10/2014 | Nixon et al. |
| 2014/0316579 A1 | 10/2014 | Taylor et al. |
| 2014/0335480 A1 | 11/2014 | Asenjo et al. |
| 2014/0358256 A1 | 12/2014 | Billi et al. |
| 2014/0359552 A1 | 12/2014 | Misra et al. |
| 2014/0372378 A1 | 12/2014 | Long et al. |
| 2014/0372561 A1 | 12/2014 | Hisano |
| 2014/0379296 A1 | 12/2014 | Nathan et al. |
| 2015/0024710 A1 | 1/2015 | Becker et al. |
| 2015/0043626 A1 | 2/2015 | Williams et al. |
| 2015/0067163 A1 | 3/2015 | Bahnsen et al. |
| 2015/0077263 A1 | 3/2015 | Ali et al. |
| 2015/0106578 A1 | 4/2015 | Warfield et al. |
| 2015/0172872 A1 | 6/2015 | Alsehly et al. |
| 2015/0177718 A1 | 6/2015 | Vartiainen et al. |
| 2015/0185716 A1 | 7/2015 | Wichmann et al. |
| 2015/0193418 A1 | 7/2015 | Koska et al. |
| 2015/0199494 A1 | 7/2015 | Koduri et al. |
| 2015/0212679 A1 | 7/2015 | Liu |
| 2015/0220080 A1 | 8/2015 | Nixon et al. |
| 2015/0220311 A1 | 8/2015 | Salter |
| 2015/0222731 A1 | 8/2015 | Shinohara et al. |
| 2015/0246852 A1 | 9/2015 | Chen et al. |
| 2015/0254330 A1 | 9/2015 | Chan et al. |
| 2015/0261215 A1 | 9/2015 | Blevins et al. |
| 2015/0277399 A1 | 10/2015 | Maturana et al. |
| 2015/0278397 A1 | 10/2015 | Hendrickson et al. |
| 2015/0296324 A1 | 10/2015 | Garaas et al. |
| 2015/0312721 A1 | 10/2015 | Singh et al. |
| 2015/0332188 A1 | 11/2015 | Yankelevich et al. |
| 2016/0098021 A1 | 4/2016 | Zornio et al. |
| 2016/0098037 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2016/0261482 A1 | 9/2016 | Mixer et al. |
| 2016/0281607 A1 | 9/2016 | Asati et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0102969 A1 | 4/2017 | Kochunni et al. |
| 2017/0103103 A1 | 4/2017 | Nixon et al. |
| 2017/0115648 A1 | 4/2017 | Nixon et al. |
| 2017/0154395 A1 | 6/2017 | Podgurny et al. |
| 2017/0199843 A1 | 7/2017 | Nixon et al. |
| 2017/0223075 A1 | 8/2017 | Hong et al. |
| 2017/0236067 A1 | 8/2017 | Tjiong |
| 2017/0238055 A1 | 8/2017 | Chang et al. |
| 2017/0255826 A1 | 9/2017 | Chang et al. |
| 2017/0255827 A1 | 9/2017 | Chang et al. |
| 2017/0255828 A1 | 9/2017 | Chang et al. |
| 2017/0255829 A1 | 9/2017 | Chang et al. |
| 2018/0012510 A1 | 1/2018 | Asenjo et al. |
| 2018/0151037 A1 | 5/2018 | Morgenthau et al. |

(56) References Cited

U.S. PATENT DOCUMENTS

2018/0343544 A1 11/2018 Fan et al.
2019/0032948 A1 1/2019 Nayak et al.

FOREIGN PATENT DOCUMENTS

| | | |
|---|---|---|
| CN | 1409232 A | 4/2003 |
| CN | 1537258 A | 10/2004 |
| CN | 1589423 A | 3/2005 |
| CN | 1757002 A | 4/2006 |
| CN | 1804744 A | 7/2006 |
| CN | 1805040 A | 7/2006 |
| CN | 1826565 A | 8/2006 |
| CN | 1864156 A | 11/2006 |
| CN | 1980194 A | 6/2007 |
| CN | 101097136 A | 1/2008 |
| CN | 101187869 A | 5/2008 |
| CN | 101387882 A | 3/2009 |
| CN | 101449259 A | 6/2009 |
| CN | 201374004 Y | 12/2009 |
| CN | 101713985 A | 5/2010 |
| CN | 101788820 A | 7/2010 |
| CN | 101802736 A | 8/2010 |
| CN | 101822050 A | 9/2010 |
| CN | 101828195 A | 9/2010 |
| CN | 101867566 A | 10/2010 |
| CN | 102063097 A | 5/2011 |
| CN | 102124432 A | 7/2011 |
| CN | 102169182 A | 8/2011 |
| CN | 102175174 A | 9/2011 |
| CN | 102184489 A | 9/2011 |
| CN | 102200993 A | 9/2011 |
| CN | 102213959 A | 10/2011 |
| CN | 102239452 A | 11/2011 |
| CN | 102243315 A | 11/2011 |
| CN | 102278987 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102780568 A | 11/2012 |
| CN | 102801779 A | 11/2012 |
| CN | 102867237 A | 1/2013 |
| CN | 103106188 A | 5/2013 |
| CN | 103403686 A | 11/2013 |
| CN | 103576638 A | 2/2014 |
| CN | 103699698 A | 4/2014 |
| CN | 104035392 A | 9/2014 |
| CN | 104049575 A | 9/2014 |
| DE | 19882113 T1 | 1/2000 |
| DE | 19882117 T1 | 1/2000 |
| EP | 0 308 390 A1 | 3/1989 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 180 441 A1 | 4/2010 |
| EP | 2 469 475 A1 | 6/2012 |
| EP | 1 344 291 B1 | 8/2012 |
| EP | 2 685 329 A1 | 1/2014 |
| EP | 2 704 401 A1 | 3/2014 |
| EP | 2 746 884 A1 | 6/2014 |
| EP | 2 801 939 A1 | 11/2014 |
| FR | 2 966 625 A1 | 4/2012 |
| GB | 2 336 977 B | 11/1999 |
| GB | 2 347 234 A | 8/2000 |
| GB | 2 336 923 B | 6/2002 |
| GB | 2 403 028 A | 12/2004 |
| GB | 2 453 426 A | 4/2009 |
| GB | 2 494 778 A | 3/2013 |
| GB | 2 512 984 A | 10/2014 |
| GB | 2 512 997 A | 10/2014 |
| GB | 2 532 849 A | 6/2016 |
| GB | 2 534 628 A | 8/2016 |
| GB | 2 536 339 A | 9/2016 |
| GB | 2 537 457 A | 10/2016 |
| JP | 64-017105 A | 1/1989 |
| JP | 01-291303 A | 11/1989 |
| JP | 05-073131 A | 3/1993 |
| JP | 05-142033 A | 6/1993 |
| JP | 05-187973 A | 7/1993 |
| JP | 05-346807 A | 12/1993 |
| JP | 06-052145 A | 2/1994 |
| JP | 06-307897 A | 11/1994 |
| JP | 08-234951 | 9/1996 |
| JP | 9-160798 A | 6/1997 |
| JP | 09-330861 A | 12/1997 |
| JP | 10-116113 A | 5/1998 |
| JP | 10-326111 A | 12/1998 |
| JP | 11-327628 A | 11/1999 |
| JP | 2000-194414 A | 7/2000 |
| JP | 2000-214914 A | 8/2000 |
| JP | 2001-512593 A | 8/2001 |
| JP | 2001-265821 A | 9/2001 |
| JP | 2002-010489 A | 1/2002 |
| JP | 2002-024423 A | 1/2002 |
| JP | 2002-99325 A | 4/2002 |
| JP | 2003-109152 A | 4/2003 |
| JP | 2003-140741 A | 5/2003 |
| JP | 2003-167621 A | 6/2003 |
| JP | 2003-167624 A | 6/2003 |
| JP | 2003-177818 A | 6/2003 |
| JP | 2003-295944 A | 10/2003 |
| JP | 2003-337794 A | 11/2003 |
| JP | 2004-030492 A | 1/2004 |
| JP | 2004-102765 A | 4/2004 |
| JP | 2004-171127 A | 6/2004 |
| JP | 2004-199624 A | 7/2004 |
| JP | 2004-227561 A | 8/2004 |
| JP | 2004-265302 A | 9/2004 |
| JP | 2004-348582 A | 12/2004 |
| JP | 2005-107758 A | 4/2005 |
| JP | 2005-216137 A | 8/2005 |
| JP | 2005-242830 A | 9/2005 |
| JP | 2005-332093 A | 12/2005 |
| JP | 2006-172462 A | 6/2006 |
| JP | 2006-185120 A | 7/2006 |
| JP | 2006-221376 A | 8/2006 |
| JP | 2006-221563 A | 8/2006 |
| JP | 2006-527426 A | 11/2006 |
| JP | 2007-137563 A | 6/2007 |
| JP | 2007-148938 A | 6/2007 |
| JP | 2007-207065 A | 8/2007 |
| JP | 2007-242000 A | 9/2007 |
| JP | 2007-286798 A | 11/2007 |
| JP | 2007-536631 A | 12/2007 |
| JP | 2007-536648 A | 12/2007 |
| JP | 2008-009793 A | 1/2008 |
| JP | 2008-065821 A | 3/2008 |
| JP | 2008-158971 A | 7/2008 |
| JP | 2008-171152 A | 7/2008 |
| JP | 2008-305419 A | 12/2008 |
| JP | 2009-064451 A | 3/2009 |
| JP | 2009-135892 A | 6/2009 |
| JP | 2009-140380 A | 6/2009 |
| JP | 2009-211522 A | 9/2009 |
| JP | 2009-251777 A | 10/2009 |
| JP | 2009-538567 A | 11/2009 |
| JP | 2010-181949 A | 8/2010 |
| JP | 2010-527486 A | 8/2010 |
| JP | 2010-250825 A | 11/2010 |
| JP | 2011-022920 A | 2/2011 |
| JP | 2011-034564 A | 2/2011 |
| JP | 2011-180629 A | 9/2011 |

(56) References Cited

FOREIGN PATENT DOCUMENTS

| | | |
|---|---|---|
| JP | 2011-204237 A | 10/2011 |
| JP | 2011-204238 A | 10/2011 |
| JP | 2012-048762 A | 3/2012 |
| JP | 2012-069118 A | 4/2012 |
| JP | 2012-084162 A | 4/2012 |
| JP | 4-934482 B2 | 5/2012 |
| JP | 2012-88953 A | 5/2012 |
| JP | 2012-215547 A | 11/2012 |
| JP | 2012-527059 A | 11/2012 |
| JP | 2012/252604 A | 12/2012 |
| JP | 2014-116027 A | 6/2014 |
| JP | 2014-523579 A | 9/2014 |
| TW | 201408020 A | 2/2014 |
| WO | WO-02/35302 A1 | 5/2002 |
| WO | WO-02/50971 | 6/2002 |
| WO | WO-03/073688 A1 | 9/2003 |
| WO | WO-2003/073688 A1 | 9/2003 |
| WO | WO-2005/083533 A1 | 9/2005 |
| WO | WO-2005/109123 A1 | 11/2005 |
| WO | WO-2007/052342 A1 | 5/2007 |
| WO | WO-2008/042786 A2 | 4/2008 |
| WO | WO-2009/021900 A1 | 2/2009 |
| WO | WO-2009/046095 A1 | 4/2009 |
| WO | WO-2010/041462 A1 | 4/2010 |
| WO | WO-2011/120625 A1 | 10/2011 |
| WO | WO-2012/016012 A2 | 2/2012 |
| WO | WO-2012/022381 A1 | 2/2012 |
| WO | WO-2012/096877 A1 | 7/2012 |
| WO | WO-2012/129400 A2 | 9/2012 |
| WO | WO-2012/177812 A1 | 12/2012 |
| WO | WO-2014/005073 A1 | 1/2014 |
| WO | WO-2014/145801 A2 | 9/2014 |
| WO | WO-2015/138706 A1 | 9/2015 |
| WO | WO-2016/057365 A1 | 4/2016 |

OTHER PUBLICATIONS

Bruzzone et al., "Different Modeling and Simulation Approaches Applied to Industrial Process Plants," Proceedings of the Emerging M&S Applications in Industry & Academia/Modeling and Humanities Symposium (2013).
First Office Action for Chinese Application No. 201410097675.2, dated May 10, 2017.
International Preliminary Report on Patentability for Application No. PCT/US2015/053931, dated Apr. 11, 2017.
Notification of First Office Action for Chinese Application No. 201410097875.8, dated Jul. 7, 2017.
Sailer et al., "Attestation-Based Policy Enforcement for Remote Access," Proceedings of the 11th ACM Conference on Computer and Communications Security (2004).
Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Sunindyo et al., "An Event-Based Empirical Process Analysis Framework," ESEM (2010).
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mahdavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).
Notice of Reasons for Rejection for Japanese Application No. 2014-041785, dated Dec. 5, 2017.
Notice of Reasons for Rejection for Japanese Application No. 2014-041785, dated Nov. 30, 2017.
Notice of Reasons for Rejection for Japanese Application No. 2014-048410, dated Dec. 29, 2017.
Notice of Reasons for Rejection for Japanese Application No. 2014-048411, dated Dec. 5, 2017.
Notice of Reasons for Rejection for Japanese Application No. 2014-049918, dated Dec. 12, 2017.
Notice of Reasons for Rejection for Japanese Application No. 2014-049919, dated Nov. 29, 2017.
Notice of Reasons for Rejection for Japanese Application No. 2014-051114, dated Dec. 28, 2017.
Notice of Reasons for Rejection for Japanese Application No. 2014-051596, dated Jan. 9, 2018.
Notice of Reasons for Rejection for Japanese Application No. 2014-051597, dated Jan. 9, 2018.
"ANSI/ISA-S5.4-1991 American National Standard Instrument Loop Diagrams" by Instrument Society of America, 1986, 22 pages.
"Control Loop Foundation—Batch and Continuous Processes", by Terrence Blevins and Mark Nixon, *International Society of Automation*, 2011, Chapter 7.
"IoT and Big Data Combine Forces," (2013). Retrieved from the Internet at: <URL:http://wiki.advantech.com/images/7/73/iot2013_whitepaper.pdf>.
Adrian et al., "Model Predictive Control of Integrated Unit Operations Control of a Divided Wall Column," Chemical Engineering and Processing: Process Information, 43(3):347-355 (2004).
Bassat et al., "Workflow Management Combined with Diagnostic and Repair Expert System Tools for Maintenance Operations," IEEE, pp. 367-375 (1993).
Bryner, "Smart Manufacturing: The Next Revolution," Chemical Engineering Process (2012). Retrieved from the Internet at: URL:http:www.aiche.org/sites/default/files/cep/20121004a.pdf.
Building Smarter Manufacturing with the Internet of Things (IoT), (2014). Retrieved from the Internet at: URL:http://www.cisco.com/web/solutions/trends/iot/iot_in_manufacturing_january.pdf.
Communication Relating to the Results of the Partial International Search, dated Jul. 11, 2014.
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Dongargaonkar et al., "PLC Based Ignition System," Conference Records of the 1999 IEEE Industry Application Conference, 1380-1387 (1999).
Examination Report for Application No. EP 14724871.0, dated Aug. 17, 2016.
Examination Report for Application No. GB1017192.4, dated May 28, 2014.
Examination Report for Application No. GB1017192.4, dated Sep. 5, 2013.
First Office Action for Chinese Application No. 201010589029.X, dated Dec. 10, 2013.
Hiller et al., "Multi Objective Optimisation for an Economical Dividing Wall Column Design," Distillation Absorption, pp. 67-72 (2010).
International Preliminary Report on Patentability for Application No. PCT/US2014/030627, dated Sep. 15, 2015.

(56) References Cited

OTHER PUBLICATIONS

International Preliminary Report on Patentability for Application No. PCT/US2015/020148, dated Sep. 14, 2016.
International Search Report and Written Opinion for Application No. PCT/US2014/030627, dated Sep. 11, 2014.
International Search Report and Written Opinion for Application No. PCT/US2015,053931, dated Jan. 26, 2016.
International Search Report and Written Opinion for Application No. PCT/US2015/020148, dated Jun. 18, 2015.
Kiss et al., "A control Perspective on Process Intensification in Dividing-Wall Columns," Chemical Engineering and Processing: Process Intensification, 50:281-292 (2011).
Krumeich et al., "Big Data Analytics for Predictive Manufacturing Control—A Case Study from Process Industry," IEEE International Congress on Big Data, pp. 530-537 (2014).
Notice of Reasons for Rejection for Japanese Application No. 2010-229513, dated Jul. 29, 2014.
Pendergast et al., "Consider Dividing Wall Columns," Chemical Processing (2008). Retrieved from the Internet at: URL:http://www.chemicalprocessing.com/articles/2008/245/?show=all.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Search Report for Application No. GB1017192.4, dated Feb. 15, 2011.
Search Report for Application No. GB1402311.3, dated Aug. 6, 2014.
Search Report for Application No. GB1403251.0, dated Aug. 8, 2014.
Search Report for Application No. GB1403407.8, dated Aug. 8, 2014.
Search Report for Application No. GB1403408.6, dated Aug. 8, 2014.
Search Report for Application No. GB1403471.4, dated Sep. 9, 2014.
Search Report for Application No. GB1403472.2, dated Aug. 22, 2014.
Search Report for Application No. GB1403474.8, dated Aug. 26, 2014.
Search Report for Application No. GB1403475.5, dated Sep. 3, 2014.
Search Report for Application No. GB1403476.3, dated Aug. 27, 2014.
Search Report for Application No. GB1403477.1, dated Aug. 28, 2014.
Search Report for Application No. GB1403478.9, dated Aug. 21, 2014.
Search Report for Application No. GB1403480.5, dated Aug. 28, 2014.
Search Report for Application No. GB1403615.6, dated Aug. 18, 2014.
Search Report for Application No. GB1403616.4, dated Sep. 1, 2014.
Search Report for Application No. GB1501042.4, dated Feb. 2, 2016.
Search Report for Application No. GB1513617.9, dated Jan. 21, 2016.
Search Report for Application No. GB1517034.3, dated May 26, 2016.
Search Report for Application No. GB1517038.4, dated Mar. 22, 2016.
Search Report for Application No. GB1617019.3, dated Feb. 27, 2017.
Shah et al., "Multicomponent Distillation Configurations with Large Energy Savings," Distillation Absorption, pp. 61-66 (2010).
Smalley, "GE Invests in Project to Embed Predictive Analytics in Industrial Internet," (2013). Retrieved from the Internet at: URL:http://data-informed.com/ge-invents-in-project-to-embed-predictive-analytics-in-industrial-internet/.
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
U.S. Appl. No. 14/174,413, filed Feb. 6, 2014, "Collecting and Delivering Data to a Big Data Machine in a Process Control System".
U.S. Appl. No. 14/212,411, filed Mar. 14, 2014, "Determining Associations and Alignments of Process Elements and Measurements in a Process".
U.S. Appl. No. 14/212,493, filed Mar. 14, 2014, "Distributed Big Data in a Process Control System".
U.S. Appl. No. 14/506,863, filed Oct. 6, 2014, "Streaming Data for Analytics in Process Control Systems".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
Woo, "Intel Drops a Big Data Shocker", downloaded from the Internet at: http://forbes.com/sites/bwoo/2013/02/27/intel-drops-a-big-data-shocker/?partner=ya dated Feb. 27, 2013.
Extended European Search Report for Application No. 17157505.3, dated Jun. 30, 2017.
First Office Action for Chinese Application No. 201410080524.6, dated Sep. 13, 2017.
First Office Action for Chinese Application No. 201410088828.7, dated Aug. 1, 2017.
First Office Action for Chinese Application No. 201410097623.5, dated Sep. 26, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
Notice of Reasons for Rejection for Japanese Application No. 2014-051599, dated Nov. 28, 2017.
Notification of First Office Action for Chinese Application No. 201410099068.X, dated Sep. 15, 2017.
Final Rejection for Japanese Application No. 2014-048410, dated May 29, 2018.
First Office Action for Chinese Application No. 201410097872.4, dated Aug. 23, 2017.
First Office Action for Chinese Application No. 201510049715.0, dated May 4, 2018.

(56) References Cited

OTHER PUBLICATIONS

Notice of Reasons for Rejection for Japanese Application No. 2014-048412, dated Feb. 27, 2018.
Notice of Reasons for Rejection for Japanese Application No. 2014-049915, dated Mar. 13, 2018.
Notice of Reasons for Rejection for Japanese Application No. 2014-049916, dated Feb. 27, 2018.
Notice of Reasons for Rejection for Japanese Application No. 2014-049917, dated Mar. 6, 2018.
Notice of Reasons for Rejection for Japanese Application No. 2014-049918, dated Apr. 10, 2018.
Notice of Reasons for Rejection for Japanese Application No. 2014-049920, dated Feb. 20, 2018.
Notice of Reasons for Rejection for Japanese Application No. 2014-051595, dated Jan. 16, 2018.
Notice of Reasons for Rejection for Japanese Application No. 2014-051596, dated Jan. 16, 2018.
Notice of Reasons for Rejection for Japanese Application No. 2014-051598, dated Mar. 13, 2018.
Notice of Reasons for Rejection for Japanese Application No. 2016-503431, dated Apr. 3, 2018.
Second Office Action for Chinese Application No. 201410088828.7, dated Apr. 27, 2018.
Second Office Action for Chinese Application No. 201410097675.2, dated Feb. 11, 2018.
Second Office Action for Chinese Application No. 201410097873.9, dated May 15, 2018.
Second Office Action for Chinese Application No. 201410097875.8, dated Jun. 6, 2018.
Second Office Action for Chinese Application No. 201410097922.9, dated Jan. 9, 2018.
Second Office Action for Chinese Application No. 201410098327.7, dated Feb. 27, 2018.
Decision of Refusal for Japanese Application No. 2014-049918, dated Aug. 21, 2018.
Decision of Refusal for Japanese Application No. 2014-051595, dated Sep. 11, 2018.
Decision of Refusal for Japanese Application No. 2014-051596, dated Oct. 23, 2018.
Examination Report for Application No. GB1402311.3, dated Sep. 28, 2018.
Examination Report for Application No. GB14724871.0, dated Oct. 8, 2018.
Final Rejection for Japanese Application No. 2014-049915, dated Nov. 6, 2018.
Notice of Reasons for Rejection for Japanese Application No. 2014-049916, dated Aug. 28, 2018.
Notice of Reasons for Rejection for Japanese Application No. 2014-049917, dated Dec. 4, 2018.
Notice of Reasons for Rejection for Japanese Application No. 2014-049920, dated Oct. 23, 2018.
Notice of Reasons for Rejection for Japanese Application No. 2014-051597, dated Jul. 31, 2018.
Third Office Action for Chinese Application No. 201410098327.7, dated Sep. 30, 2018.
Zhu et al., "Localization Optimization Algorithm of Maximum Likelihood Estimation Based on Received Signal Strength," IEEE 9th International Conference on Communication Software and Networks (ICCSN), pp. 830-834 (2017).
Decision of Refusal for Japanese Application No. 2014-048410, dated May 29, 2018.
Decision of Rejection for Chinese Application No. 201410097675.2, dated Jul. 2, 2018.
Examination Report for Application No. EP 14724871.0, dated Aug. 10, 2018.
First Office Action for Chinese Application No. 201510113223.3, dated Jul. 4, 2018.
First Office Action for Chinese Application No. 201580014241.4, dated Jun. 22, 2018.
Notice of Reasons for Rejection for Japanese Application No. 2014-048411, dated Jul. 31, 2018.
Notice of Reasons for Rejection for Japanese Application No. 2014-049919, dated Jul. 31, 2018.
Notice of Reasons for Rejection for Japanese Application No. 2014-049920, dated Jun. 5, 2018.
Notice of Reasons for Rejection for Japanese Application No. 2014-051595, dated May 29, 2018.
Notice of Reasons for Rejection for Japanese Application No. 2014-051596, dated May 29, 2018.
Second Office Action for Chinese Application No. 201410097623.5, dated Jun. 26, 2018.
Second Office Action for Chinese Application No. 201410097872.4 dated Jul. 12, 2018.
Second Office Action for Chinese Application No. 201410097921.4, dated Jul. 5, 2018.
Second Office Action for Chinese Application No. 201410098326.2, dated Jun. 19, 2018.
Second Office Action for Chinese Application No. 201410098982.2, dated Jun. 11, 2018.
Second Office Action for Chinese Application No. 201410099068.X, dated Jun. 14, 2018.
Second Office Action for Chinese Application No. 201410099103.8, dated Jun. 5, 2018.
Third Office Action for Chinese Application No. 201410097922.9, dated Aug. 3, 2018.
First Office Action for Chinese Application No. 201510640227.7, dated Mar. 15, 2019.
Notice of Reasons for Rejection for Japanese Application No. 2015-015738, dated Mar. 12, 2019.
Notice of Reasons for Rejection for Japanese Application No. 2015-159015, dated Mar. 19, 2019.
Decision of Refusal for Japanese Application No. 2014-048412, dated Oct. 26, 2018.
Decision of Refusal for Japanese Application No. 2014-051597, dated Nov. 13, 2018.
Decision of Rejection for Chinese Application No. 201410097873.9, dated Dec. 5, 2018.
Decision of Rejection for Chinese Application No. 201410098982.2, dated Jan. 23, 2019.
First Office Action for Chinese Application No. 201510640439.5, dated Feb. 25, 2019.
First Office Action for Chinese Application No. 201510641015.0, dated Feb. 27, 2019.
First Office Action for Chinese Application No. 201580054441.2, dated Feb. 27, 2019.
Notice of Reasons for Rejection for Japanese Application No. 2014-051114, dated Mar. 5, 2019.
Notice of Reasons for Rejection for Japanese Application No. 2014-051598, dated Nov. 13, 2018.
Notice of Reasons for Rejection for Japanese Application No. 2016-503431, dated Jan. 8, 2019.
Third Office Action for Chinese Application No. 201410098326.2, dated Jan. 17, 2019.
Third Office Action for Chinese Application No. 201410099068.X, dated Jan. 16, 2019.
Decision of Refusal for Japanese Application No. 2014-041785, dated May 7, 2019.
Decision of Refusal for Japanese Application No. 2014-048411, dated Mar. 1, 2019.
Decision of Refusal for Japanese Application No. 2014-049920, dated Apr. 9, 2019.
Examination Report for Application No. GB1402311.3, dated Aug. 6, 2019.
Examination Report for Application No. GB1901546.0, dated Aug. 6, 2019.
Fourth Office Action for Chinese Application No. 201410098327.7, dated Mar. 28, 2019.
Notice of Reasons for Rejection for Japanese Application No. 2015-015738, dated Jun. 18, 2019.
Notice of Reasons for Rejection for Japanese Application No. 2015-052138, dated May 13, 2019.

(56) References Cited

OTHER PUBLICATIONS

Notice of Reasons for Rejection for Japanese Application No. 2016-557216, dated May 14, 2019.
Search Report for Application No. GB1503743.5, dated Apr. 25, 2019.

* cited by examiner

| ROW KEY (ID-UPPERTIMESTAMP) | REAL.GOOD.+0 | REAL.GOOD.+20 | REAL.GOOD.+40 | ..... | REAL.GOOD.+3580 |
|---|---|---|---|---|---|
| 098-1372672800 | 0.69 | | 0.99 | | 0.71 |
| 098-1372676400 | 0.81 | 0.82 | | | |
| 057-1372672800 | 45.3 | | 45.4 | | |
| 057-1372676400 | 46.7 | 46.5 | | | |

| ROW KEY | IDENTIFICATION | TIMESTAMP PORTION 1 |

535

| COLUMN | COLUMN FAMILY | TYPE | STATUS | TIMESTAMP PORTION 2 |

540

| VALUE | AGGREGATED HIGH VALUE (541) | AGGREGATED LOW VALUE (542) | AGGREGATED CLOSE VALUE (543) |

*FIG. 5D*

MANAGING BIG DATA IN PROCESS CONTROL SYSTEMS

CROSS-REFERENCE TO RELATED APPLICATIONS

This application is a divisional of U.S. patent application Ser. No. 14/169,965, entitled "Managing Big Data in Process Control Systems," filed on Jan. 31, 2014, and issued on May 30, 2017 as U.S. Pat. No. 9,665,088, the entire disclosure of which is hereby incorporated by reference herein.

TECHNICAL FIELD

This patent relates generally to process plants and to process control systems, and more particularly, to the storage and management of big data in process plants and in process control system.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process control plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object-oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of currently known process control plants and process control systems is strongly influenced by limited controller and device memory, communication bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, selected data that is to be archived or saved (as indicated by the configuration of the controller) is reported to the workstation or computing device for storage at an appropriate data historian or data silo. The current techniques used to report the data poorly utilizes communication resources and induces excessive controller loading. Additionally, due to the time delays in communication and sampling at the historian or silo, the data collection and timestamping is often out of sync with the actual process.

Similarly, in batch process control systems, to minimize controller memory usage, batch recipes and snapshots of controller configuration typically remain stored at a centralized administrative computing device or location (e.g., at a data silo or historian), and are only transferred to a controller when needed. Such a strategy introduces significant burst loads in the controller and in communications between the workstation or centralized administrative computing device and the controller.

Furthermore, the capability and performance limitations of relational databases of currently known process control systems, combined with the previous high cost of disk storage, play a large part in structuring data into independent entities or silos to meet the objectives of specific applications. For example, within the DeltaV™ system, the archiving of process models, continuous historical data, and batch and event data are saved in three different application databases or silos of data. Each silo has a different interface to access the data stored therein.

Structuring data in this manner creates a barrier in the way that historized data is accessed and used. For example, the root cause of variations in product quality may be associated with data in more than one of these data silos. However, because of the different file structures of the silos, it is not possible to provide tools that allow this data to be quickly and easily accessed for analysis. Further, audit or synchronizing functions must be performed to ensure that data across different silos is consistent.

The limitations of currently known process plants and process control system discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain data for troubleshooting and generating updated models. Additionally, the obtained data may be inaccurate due to data compression, insufficient bandwidth, or shifted timestamps.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

Current techniques for storing, accessing, and processing big data, and especially big data associated with process plants and process control systems, are inefficient. For example, various existing process plants use relational databases configured to store process control data which, in some cases, results in too much allocated storage and long retrieval times. Further, the storage of continuous historical data does not enable users or administrators to efficiently or effectively process trends or identify parameters, or combinations of parameters, from multiple data entries. Accordingly, there is an opportunity to develop techniques to more effectively and efficiently organize, process, and manage big data associated with process plants and process control systems.

SUMMARY

A process control system or plant provides an infrastructure for supporting large-scale data mining and data analytics of process control data. A process control data network incorporates a big data schema which stores process control data and attributes thereof using lightweight non-relational database storage techniques. Using these techniques, the big data schema need not allocate storage for various process control attributes that are not present in the process control data. Further, the big data schema organizes the process control data into tables having rowkeys and column families to enable users and administrators to efficiently locate, access, and analyze the stored data.

The big data schema may create the rowkeys and the column families using various combinations of the process control data and attributes thereof. Generally, the rowkeys are unique key values that organize the data within the big data schema and that users may use to query and retrieve specific data. For example, some rowkeys incorporate timestamps (or portions thereof) corresponding to when the process control data is recorded. Each column family includes one or more column qualifiers that the big data schema creates using process control data attributes. The big data schema stores relevant measurements or values based on the corresponding rowkeys and column qualifiers. Some rowkeys may have multiple associated measurements (and multiple associated column qualifiers), thus resulting in a three-dimensional storage schema.

The big data schema also includes techniques for periodically creating and storing "snapshot" data corresponding to the underlying stored data. For example, for every elapsed minute, the big data schema may calculate and store the minimum, maximum, mean, and standard deviation for the underlying data having a timestamp within that minute. The big data schema thus enables a user to access specified data (e.g., a specific process variable) over a specified time period (e.g., hourly, weekly, monthly). The big data schema then presents the data to the user in an interface to enable the user to efficiently and effectively assess the snapshot data and perform desired data analyses.

BRIEF DESCRIPTION OF THE DRAWINGS

FIG. 5C is an example big data record configured for storage according to a big data schema;

FIG. 5D is an example structure for storing "snapshot" data in a big data schema;

DETAILED DESCRIPTION

Figure 1:
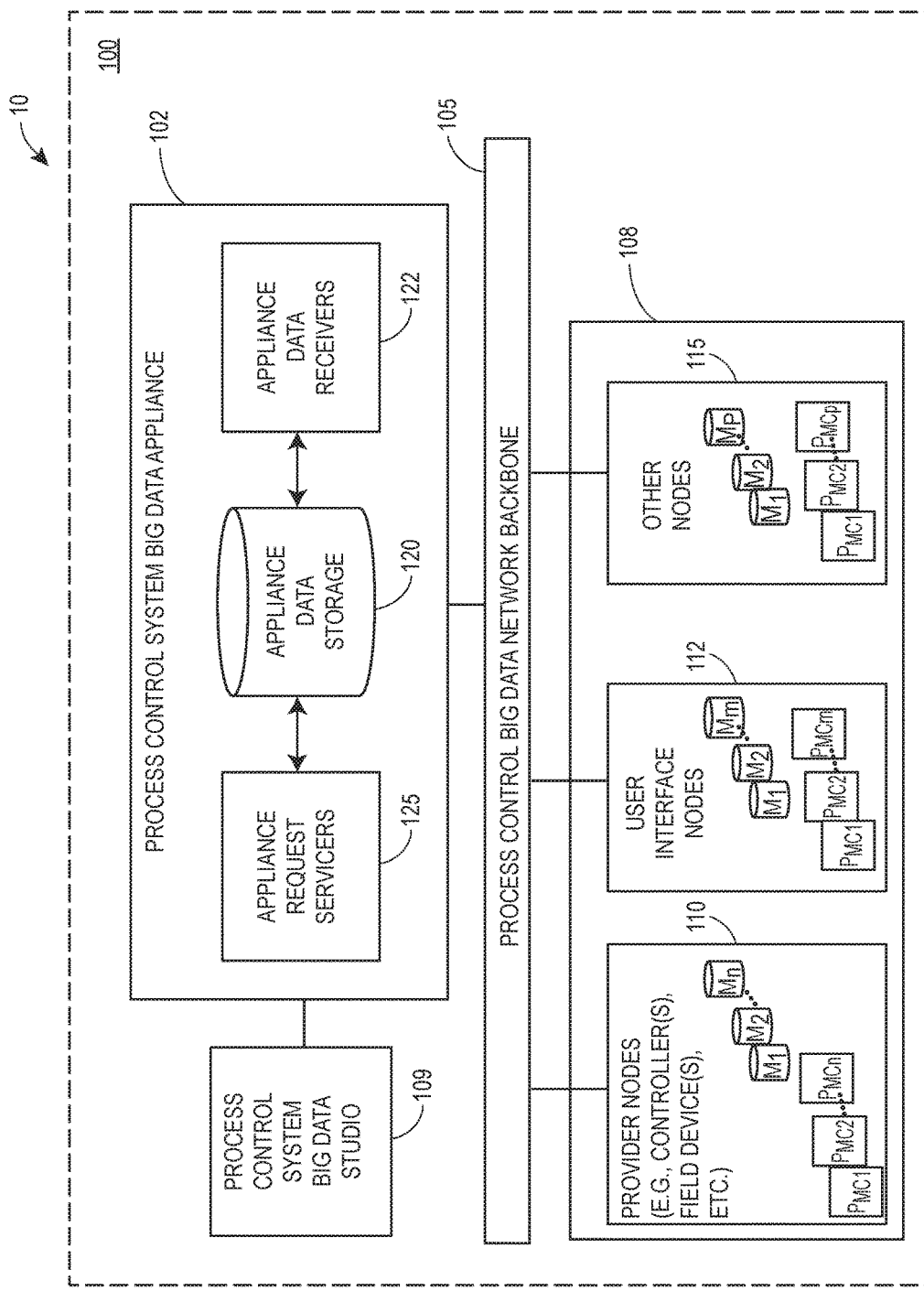
FIG. 1 is a block diagram of an example big data network for a process plant or process control system.

FIG. 1 is a block diagram of an example big data network 100 within or associated with a process plant or process control system 10. The example process control system big data network 100 includes a process control system big data apparatus or appliance 102, a process control system big data network backbone 105, and a plurality of nodes 108 that are communicatively connected to the backbone 105. The plurality of nodes 108 may collect and cache process-related data, plant-related data, and other types of data, and the network backbone 105 may deliver the data to the process control system big data apparatus or appliance 102 for long-term storage (e.g., "historization") and processing. In one implementation, at least some of the data may be delivered between nodes of the network 100, e.g., to control a process in real-time.

The process control system big data network 100 may collect and store any type of data related to the process control system 10. For example, the process control system big data network 100 collects and stores real-time process data such as continuous, batch, measurement and event data that is generated while a process is being controlled in the process plant 10 (and, in some cases, is indicative of an effect of a real-time execution of the process). Process definition, arrangement or set-up data such as configuration data and/or batch recipe data, as well as data corresponding to the configuration, execution and results of process diagnostics may also be collected and stored. Of course, other types of process data may also be collected and stored.

In addition, the process control system big data network 100 may collect and store data highway traffic and network management data of the backbone 105 and of various other communication networks of the process plant 10. Still further, the process control system big data network 100 may collect and store user-related data such as data related to user traffic, login attempts, queries and instructions, as well as text data (e.g., logs, operating procedures, manuals, etc.), spatial data (e.g., location-based data) and multi-media data (e.g., closed circuit TV, video clips, etc.).

In addition, the process control system big data network 100 may collect and store data that is related to the process plant 10 (e.g., to physical equipment included in the process plant 10 such as machines and devices) but that may not be generated by applications that directly configure, control, or diagnose a process. For example, the process control system big data network 100 may collect and store vibration data, steam trap data, data indicative of a value of a parameter corresponding to plant safety (e.g., corrosion data, gas detection data, etc.), and/or data indicative of an event corresponding to plant safety. In some cases, the process control system big data network 100 may collect and store data corresponding to the health of machines, plant equipment and/or devices. For example, equipment data (e.g., pump health data determined based on vibration data and other data) may be collected. In some cases, the process control system big data network 100 may collect and store data corresponding to the configuration, execution and results of equipment, machine, and/or device diagnostics.

Moreover, the process control system big data network 100 may collect and store data generated by or transmitted to entities external to the process plant 10, such as data related to costs of raw materials, expected arrival times of parts or equipment, weather data, and other external data. If desired, all data that is generated, received, or observed by all nodes 108 that are communicatively connected to the network backbone 105 may be collected and caused to be stored at the process control system big data appliance 102.

As illustrated in FIG. 1, the process control system big data network 100 includes a process control system big data studio 109 configured to provide a primary interface into the process control system big data network 100 for configuration and data exploration, e.g., a user interface or an interface for use by other applications. The process control system big data studio 109 may connect to the big data appliance 102 via the process control system big data network backbone 105, or may directly connect to the process control system big data appliance 102.

Process Control Big Data Network Nodes

As illustrated in FIG. 1, the plurality of nodes 108 of the process control big data network 100 may include several different groups of nodes 110, 112, 115. A first group of nodes 110, referred to herein as "provider nodes 110" or "provider devices 110," may include one or more nodes or devices that generate, route, and/or receive process control data to enable processes to be controlled in real-time in the process plant environment 10. Examples of provider devices or nodes 110 may include devices whose primary function is directed to generating and/or operating on process control data to control a process, e.g., wired and wireless field devices, controllers, or input/output (I/O devices). Other examples of provider devices 110 may include devices whose primary function is to provide access to or routes through one or more communication networks of the process control system (of which the process control big network 100 is one), e.g., access points, routers, interfaces to wired control busses, gateways to wireless communication networks, gateways to external networks or systems, and other such routing and networking devices. Still other examples of provider devices 110 may include devices whose primary function is to temporarily store process data and other related data that is accumulated throughout the process control system 10 and to cause the temporarily stored data to be transmitted for historization at the process control system big data appliance 102.

At least one of the provider devices 110 may communicatively connect to the process control big data network backbone 105 in a direct manner. In addition, at least one of the provider devices 110 may communicatively connect to the backbone 105 in an indirect manner. For example, a wireless field device may communicatively connect to the backbone 105 via a router, and access point, and a wireless gateway. Typically, provider devices 110 do not have an integral user interface, although some of the provider devices 100 may have the capability to be in communicative connection with a user computing device or user interface, e.g., by communicating over a wired or wireless communication link, or by plugging a user interface device into a port of the provider device 110.

As illustrated in FIG. 1, a second group of nodes 112, referred to herein as "user interface nodes 112" or user interface devices 112," may include one or more nodes or devices that each has an integral user interface via which a user or operator may interact with the process control system or process plant 10 to perform activities related to the process plant 10 (e.g., configure, view, monitor, test, analyze, diagnose, order, plan, schedule, annotate, and/or other activities). Examples of these user interface nodes or devices 112 may include mobile or stationary computing devices, workstations, handheld devices, tablets, surface computing devices, and any other computing device having a processor, a memory, and an integral user interface. Integrated user interfaces may include a screen, a keyboard, keypad, mouse, buttons, touch screen, touch pad, biometric interface, speakers and microphones, cameras, and/or any other user interface technology. Each user interface node 112 may include one or more integrated user interfaces. The user interface nodes 112 may include a direct connection to the process control big data network backbone 105, or may include in indirect connection to the backbone 105, e.g., via an access point or a gateway. The user interface nodes 112 may communicatively connect to the process control system big data network backbone 105 in a wired manner and/or in a wireless manner.

Of course, the plurality of nodes 108 of the process control big data network 100 is not limited to only provider nodes 110 and user interface nodes 112. One or more other types of nodes 115 may optionally be included in the plurality of nodes 108. For example, a node of a system that is external to the process plant 10 (e.g., a lab system or a materials handling system) may communicatively connect to the network backbone 105 of the system 100. A node or device 115 may communicatively connect to the backbone 105 via a direct or an indirect connection. In addition, a node or device 115 may communicatively connect to the backbone 105 via a wired or a wireless connection.

At least some of the nodes 108 of the process control system big data network 100 may include an integrated firewall. Further, any number of the nodes 108 (e.g., zero nodes, one node, or more than one node) may each include respective memory storage (denoted in FIG. 1 by the icons $M_X$) to store or cache tasks, measurements, events, and other data in real-time. A memory storage $M_X$ may comprise high density memory storage technology, for example, solid state drive memory, semiconductor memory, optical memory, molecular memory, biological memory, or any other suitable high density memory technology, as well as flash memory. The memory storage $M_X$ (and, in some cases, the flash memory) may be configured to temporarily store or cache data that is generated by, received at, or otherwise observed by its respective node 108. The flash memory $M_X$ of at least some of the nodes 108 (e.g., a controller device) may also store snapshots of node configuration, batch recipes, and/or other data to minimize delay in using this information during normal operation or after a power outage or other event that causes the node to be off-line. If desired, all of the nodes 110, 112 and any number of the nodes 115 may include high density memory storage $M_X$. It is understood that different types or technologies of high density memory storage $M_X$ may be utilized across the set of nodes 108, or across a subset of nodes included in the set of nodes 108.

Any number of the nodes 108 (e.g., zero nodes, one node, or more than one node) may each include respective multi-core hardware (e.g., a multi-core processor or another type of parallel processor), as denoted in FIG. 1 by the icons $P_{MCX}$. At least some of the nodes 108 may designate one of the cores of its respective processor $P_{MCX}$ for caching real-time data at the node and for causing the cached data to be transmitted for storage at the process control system big data appliance 102. Additionally or alternatively, at least some of the nodes 108 may designate more than one of the multiple cores of its respective multi-core processor $P_{MCX}$ for caching real-time data. The one or more designated cores for caching real-time data (and, in some cases, for causing the cached data to be stored at big data appliance 102) may be exclusively designated as such (e.g., the one or more designated cores may perform no other processing except processing related to caching and transmitting big data). In particular, at least some of the nodes 108 may designate one of its cores to perform operations to control a process in the process plant 10. Additionally or alternatively, one or more cores may be designated exclusively for performing operations to control a process, and may not be used to cache and transmit big data. It is understood that different types or technologies of multi-core processors $P_{MCX}$ may be utilized across the set of nodes 108, or across a subset of nodes of the set of nodes 108. All of the nodes 110, 112 and any number of the nodes 115 may include some type of multi-core processor $P_{MCX}$.

It is noted, though, that while FIG. 1 illustrates the nodes 108 as each including both a multi-core processor $P_{MCX}$ and a high density memory $M_X$, each of the nodes 108 is not required to include both a multi-core processor $P_{MCX}$ and a high density memory $M_X$. For example, some of the nodes 108 may include only a multi-core processor $P_{MCX}$ and not a high density memory $M_X$, some of the nodes 108 may include only a high density memory $M_X$ and not a multi-core processor $P_{MCX}$, some of the nodes 108 may include both a multi-core processor $P_{MCX}$ and a high density memory $M_X$, and/or some of the nodes 108 may include neither a multi-core processor $P_{MCX}$ nor a high density memory $M_X$.

Examples of real-time data that may be cached or collected by provider nodes or devices 110 may include measurement data, configuration data, batch data, event data, maintenance data, and/or continuous data. For instance, real-time data corresponding to configurations, batch recipes, setpoints, outputs, rates, control actions, diagnostics, alarms, events and/or changes thereto may be collected. Other examples of real-time data may include process models, statistics, status data, and network and plant management data.

Examples of real-time data that user interface nodes or devices 112 may cache or collect may include, for example, user logins, user queries, data captured by a user (e.g., by camera, audio, or video recording device), user commands, creation, modification or deletion of files, a physical or spatial location of a user interface node or device, results of a diagnostic or test performed by the user interface device 112, and other actions or activities initiated by or related to a user interacting with a user interface node 112.

Collected data may be dynamic or static data. Collected data may include, for example, database data, streaming data, and/or transactional data. Generally, any data that a node 108 generates, receives, or observes may be collected or cached with a corresponding timestamp or indication of a time of collection/caching. In some cases, all data that a node 108 generates, receives, or observes is collected or cached in its memory storage (e.g., high density memory storage $M_X$) with a respective indication of a time of each datum's collection/caching (e.g., a timestamp).

Each of the nodes 110, 112 (and, optionally, at least one of the other nodes 115) may be configured to automatically collect or cache real-time data and to cause the collected/cached data to be delivered to the big data appliance 102 and/or to other nodes 108 without requiring lossy data compression, data sub-sampling, or configuring the node for data collection purposes. Unlike prior art process control systems, the identity of data that is collected at the nodes or devices 108 of the process control system big data network 100 need not be configured into the devices 108 a priori. Further, the rate at which data is collected at and delivered from the nodes 108 also need not be configured, selected or defined. Instead, the nodes 110, 112 (and, optionally, at least one of the other nodes 115) of the process control big data system 100 may automatically collect all data that is generated by, received at, or obtained by the node at the rate at which the data is generated, received or obtained, and may cause the collected data to be delivered in high fidelity (e.g., without using lossy data compression or any other techniques that may cause loss of original information) to the process control big data appliance 102 and, optionally, to other nodes 108 of the network 100.

Figure 2:
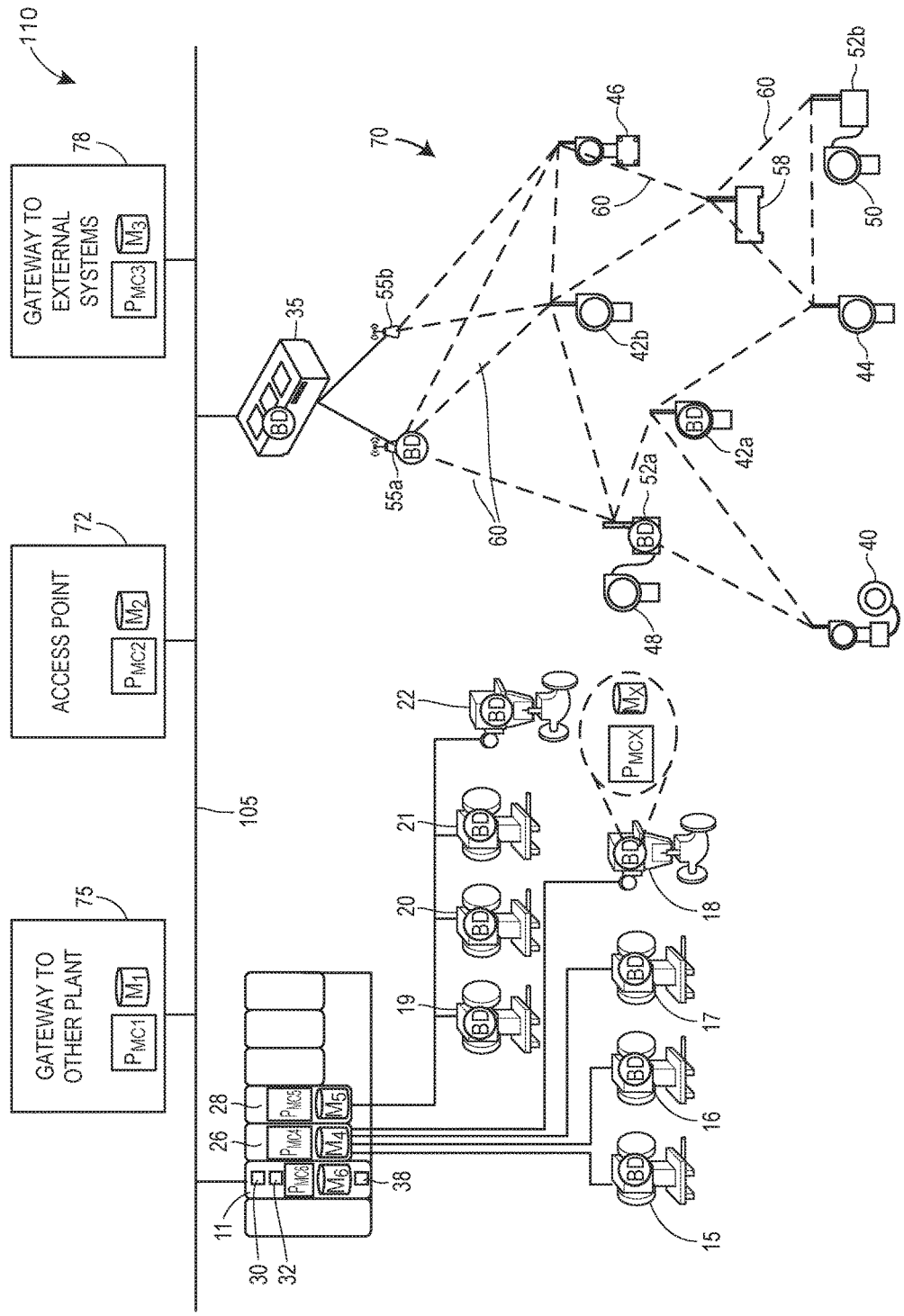
FIG. 2 is a block diagram illustrating an example arrangement of provider nodes included in the process control system big data network of FIG. 1.

A detailed block diagram illustrating example provider nodes 110 connected to process control big data network backbone 105 is illustrated in FIG. 2. As previously discussed, provider nodes 110 may include devices whose main function is to automatically generate and/or receive process control data that is used to perform functions to control a process in real-time in the process plant environment 10, such as process controllers, field devices and I/O devices. In a process plant environment 10, process controllers receive signals indicative of process measurements made by field devices, process this information to implement a control routine, and generate control signals that are sent over wired or wireless communication links to other field devices to control the operation of a process in the plant 10. Typically, at least one field device performs a physical function (e.g., opening or closing a valve, increasing or decreasing a temperature, etc.) to control the operation of a process, and some types of field devices may communicate with controllers using I/O devices. Process controllers, field devices, and I/O devices may be wired or wireless, and any number and combination of wired and wireless process controllers, field devices and I/O devices may be nodes 110 of the process control big data network 100.

FIG. 2 illustrates a controller 11 that is communicatively connected to wired field devices 15-22 via input/output (I/O) cards 26 and 28, and that is communicatively connected to wireless field devices 40, 42, 44, 46 via a wireless gateway 35 and the network backbone 105. (In some cases, though, the controller 11 may communicatively connect to the wireless gateway 35 using a communications network other than the backbone 105, such as by using another wired or a wireless communication link.) In FIG. 2, the controller 11 is shown as being a node 110 of the process control system big data network 100, and is directly connected to the process control big data network backbone 105.

The controller 11, which may be, by way of example, the DeltaV™ controller sold by Emerson Process Management, may operate to implement a batch process or a continuous process using at least some of the field devices 15-22 and 40-46. The controller 11 may communicatively connect to the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. The controller 11 may additionally or alternatively communicatively connect with at least some of the field devices 15-22 and 40-46 using the big data network backbone 105. In the system illustrated in FIG. 2, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The controller 11 of FIG. 2 includes a processor 30 that implements or oversees one or more process control routines (stored in a memory 32), which may include control loops. The processor 30 may communicate with the field devices 15-22 and 40-46 and with other nodes (e.g., nodes 110, 112, 115) that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object-oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

The controller 11 may also implement a control strategy using what are commonly referred to as function blocks, wherein each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocols. As illustrated in FIG. 2, the field devices 15-18 are standard 4-20 mA devices or HART devices that communicate over analog lines or combined analog and digital lines to the I/O card 26, while the field devices 19-22 are smart devices, such as FOUNDATION® Fieldbus field devices, that communicate over a digital bus to the I/O card 28 using a Fieldbus communications protocol. In other implementations, though, at least some of the wired field devices 15-22 and/or at least some of the I/O cards 26, 28 may communicate with the controller 11 using the big data network backbone 105. Further, at least some of the wired field devices 15-22 and/or at least some of the I/O cards 26, 28 may be nodes of the process control system big data network 100.

In the system illustrated in FIG. 2, the wireless field devices 40-46 communicate in a wireless network 70 using a wireless protocol, such as the WirelessHART protocol. Such wireless field devices 40-46 may directly communicate with one or more other nodes 108 of the process control big data network 100 that are also configured to communicate wirelessly (using the wireless protocol, for example). To communicate with one or more other nodes 108 that are not configured to communicate wirelessly, the wireless field devices 40-46 may utilize a wireless gateway 35 connected to the backbone 105 or to another process control communication network. In some cases, at least some of the wireless field devices 40-46 may be nodes of the process control system big data network 100.

The wireless gateway 35 is an example of a provider device 110 that may provide access to various wireless devices 40-58 of a wireless communication network 70. In particular, the wireless gateway 35 provides communicative coupling between the wireless devices 40-58, the wired devices 11-28, and/or other nodes 108 of the process control big data network 100 (including the controller 11 of FIG. 2). For example, the wireless gateway 35 may provide communicative coupling by using the big data network backbone 105 and/or by using one or more other communications networks of the process plant 10.

The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers. In addition to protocol and command conversion, the wireless gateway 35 may provide synchronized clocking used by time slots and superframes (sets of communication time slots spaced equally in time) of a scheduling scheme associated with the wireless protocol implemented in the wireless network 70. Furthermore, the wireless gateway 35 may provide network management and administrative functions for the wireless network 70, such as resource management, performance adjustments, network fault mitigation, monitoring traffic, security, and the like. The wireless gateway 35 may be a node 110 of the process control system big data network 100.

Similar to the wired field devices 15-22, the wireless field devices 40-46 of the wireless network 70 may perform physical control functions within the process plant 10, e.g., opening or closing valves or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some scenarios, the wireless network 70 may include non-wireless devices. For example, a field device 48 of FIG. 2 may be a legacy 4-20 mA device and a field device 50 may be a traditional wired HART device. To communicate within the network 70, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 32-46 and 52-58 may communicate with each other and with the wireless gateway 35 over wireless links 60 of the wireless communication network 70.

Accordingly, FIG. 2 includes several examples of provider devices 110 which primarily serve to provide network routing functionality and administration to various networks of the process control system. For example, the wireless gateway 35, the access points 55a, 55b, and the router 58 include functionality to route wireless packets in the wireless communication network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as WirelessHART.

The provider nodes 110 of the process control big data network 100, though, may also include other nodes that communicate using other wireless protocols. For example, the provider nodes 110 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices (e.g., user interface devices 112) to communicate over a respective wireless network that is different from the wireless network 70 and that supports a different wireless protocol than the wireless network 70. In some scenarios, in addition to portable computing devices, one or more process control devices (e.g., controller 11, field devices 15-22, or wireless devices 35, 40-58) may also communicate using the wireless protocol supported by the access points 72.

Additionally or alternatively, the provider nodes 110 may include one or more gateways 75, 78 to systems that are external to the immediate process control system 10. Typically, such systems are customers or suppliers of information generated or operated on by the process control system 10. For example, a plant gateway node 75 may communicatively connect the immediate process plant 10 (having its own respective process control big data network backbone 105) with another process plant having its own respective process control big data network backbone. If desired, a single process control big data network backbone 105 may service multiple process plants or process control environments.

In another example, a plant gateway node 75 may communicatively connect the immediate process plant 10 to a legacy or prior art process plant that does not include a process control big data network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.).

The provider nodes 110 may include one or more external system gateway nodes 78 to communicatively connect the process control big data network 100 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

FIG. 2 illustrates a single controller 11 with a finite number of field devices 15-22 and 40-46. If desired, the provider nodes 110 of the process control big data network 110 may include any number of controllers 11, and any of the controllers 11 may communicate with any number of wired or wireless field devices 15-22, 40-46 to control a process in the plan 10. Furthermore, the process plant 10 may also include any number of wireless gateways 35, routers 58, network access points 55, wireless process control communication networks 70, wireless access points 72, and/or gateways 75, 78.

As previously discussed, one or more of the provider nodes 110 may include a respective multi-core processor $P_{MCX}$, a respective high density memory storage $M_X$, or both a respective multi-core processor $P_{MCX}$ and a respective high density memory storage $M_X$ (denoted in FIG. 2 by the icon BD). Each provider node 100 may utilize its memory storage $M_X$ (and optionally its flash memory) to collect and cache data. Each of the nodes 110 may cause its cached data to be transmitted to the process control system big data appliance 102. For example, a node 110 may cause at least a portion of the data in its cache to be periodically transmitted to the big data appliance 102. Alternatively or additionally, the node 110 may cause at least a portion of the data in its cache to be streamed to the big data appliance 102. For example, the process control system big data appliance 102 may be a subscriber to a streaming service that delivers the cached or collected data from the node 110, and the provider node 110 may host the streaming service.

For nodes 110 that have a direct connection with the backbone 105 (e.g., the controller 11, the plant gateway 75, the wireless gateway 35), the respective cached or collected data may be transmitted directly from the node 110 to the process control big data appliance 102 via the backbone 105. For at least some of the nodes 110, though, the collection and/or caching may be leveled or layered, so that cached or collected data at a node that is further downstream (e.g., is further away) from the process control big data appliance 102 is intermediately cached at a node that is further upstream (e.g., is closer to the big data appliance 102).

To illustrate layered or leveled data caching, an example scenario is provided. In this example scenario, referring to FIG. 2, a field device 22 caches process control data that it generates or receives, and causes the contents of its cache to be delivered to an "upstream" device included in the communication path between the field device 22 and the process control big data appliance 102, such as the I/O device 28 or the controller 11. For example, the field device 22 may stream the contents of its cache to the I/O device 28, or the field device 22 may periodically transmit the contents of its cache to the I/O device 28. The I/O device 28 caches the information received from the field device 22 in its memory $M_5$ (and, in some cases, may also cache data received from other downstream field devices 19-21 in its memory $M_5$) along with other data that the I/O device 28 directly generates, receives and observes. The data that the I/O device 28 collects and caches (including the contents of the cache of the field device 22) may then be periodically transmitted and/or streamed to the upstream controller 11. Similarly, at the level of the controller 11, the controller 11 caches information received from downstream devices (e.g., the I/O cards 26, 28, and/or any of the field devices 15-22) in its memory $M_6$, and aggregates, in its memory $M_6$, the downstream data with data that the controller 11 itself directly generates, receives and observes. The controller 11 may then periodically deliver and/or stream the aggregated collected or cached data to the process control big data appliance 102.

In a second example scenario of layered or leveled caching, the controller 11 controls a process using wired field devices (e.g., one or more of the devices 15-22) and at least one wireless field device (e.g., wireless field device 44). In a first implementation of this second example scenario, the cached or collected data at the wireless device 44 is delivered and/or streamed directly to the controller 11 from the wireless device 44 (e.g., via the big data network 105), and is stored at the controller cache $M_6$ along with data from other devices or nodes that are downstream from the controller 11. The controller 11 may periodically deliver or stream the data stored in its cache $M_6$ to the process control big data appliance 102.

In another implementation of this second example scenario, the cached or collected data at the wireless device 44 may be ultimately delivered to the process control big data appliance 102 via an alternate leveled or layered path, e.g., via the device 42a, the router 52a, the access point 55a, and the wireless gateway 35. In this case, at least some of the nodes 41a, 52a, 55a or 35 of the alternate path may cache data from downstream nodes and may periodically deliver or stream its cached data to a node that is further upstream.

Accordingly, the process control system big data network 100 may cache different types of data at different nodes using different layering or leveling arrangements. For example, data corresponding to controlling a process may be cached and delivered in a layered manner using provider devices 110 whose primary function is control (e.g., field devices, I/O cards, controllers), whereas data corresponding to network traffic measurement may be cached and delivered in a layered manner using provider devices 110 whose primary function is traffic management (e.g., routers, access points, and gateways). In some cases, data may be delivered via provider nodes or devices 110 whose primary function (and, in some scenarios, sole function) is to collect and cache data from downstream devices (referred to herein as "historian nodes"). For example, a leveled system of historian nodes or computing devices may be located throughout the network 100, and each node 110 may periodically deliver or stream cached data to a historian node of a similar level, e.g., using the backbone 105. Downstream historian nodes may deliver or stream cached data to upstream historian nodes, and ultimately the historian nodes that are immediately downstream of the process control big data appliance 102 may deliver or stream respective cached data for storage at the process control big data appliance 102.

If desired, nodes 110 that communicate with each other may perform layered caching using the process control system big data network backbone 105, and at least some of the nodes 110 may communicate cached data to other nodes 110 at a different level using another communication network and/or other protocol, such as HART, WirelessHART, Fieldbus, DeviceNet, WiFi, Ethernet, or other protocols.

Of course, while leveled or layered caching has been discussed with respect to provider nodes 110, the concepts and techniques may apply equally to user interface nodes 112 and/or to other types of nodes 115 of the process control system big data network 100. Still further, a subset of the nodes 108 may perform leveled or layered caching, while another subset of the nodes 108 may cause their cached/collected data to be directly delivered to the process control big data appliance 102 without being cached or temporarily stored at an intermediate node. If desired, historian nodes may cache data from multiple different types of nodes, e.g., from a provider node 110 and from a user interface node 112.

Process Control System Big Data Network Backbone

Returning to FIG. 1, the process control system big data network backbone 105 may include a plurality of networked computing devices or switches that are configured to route packets to/from various nodes 108 of the process control system big data network 100 and to/from the process control big data appliance 102 (which is itself a node of the process control system big data network 100). The plurality of networked computing devices of the backbone 105 may be interconnected by any number of wireless and/or wired links. The process control system big data network backbone 105 may additionally include one or more firewall devices.

The big data network backbone 105 may support one or more suitable routing protocols, e.g., protocols included in the Internet Protocol (IP) suite (e.g., UDP (User Datagram Protocol), TCP (Transmission Control Protocol), Ethernet, etc.), or other suitable routing protocols. At least some of the nodes 108 may utilize a streaming protocol such as the Stream Control Transmission Protocol (SCTP) to stream cached data from the nodes to the process control big data appliance 102 via the network backbone 105. Typically, each node 108 included in the process data big data network 100 may support at least an application layer (and, for some nodes, additional layers) of the routing protocol(s) supported by the backbone 105. Each node 108 may be uniquely identified within the process control system big data network 100, e.g., by a unique network address.

At least a portion of the process control system big data network 100 may be an ad-hoc network. As such, at least some of the nodes 108 may connect to the network backbone 105 (or to another node of the network 100) in an ad-hoc manner. Typically, each node that requests to join the network 100 must be authenticated; however authentication is discussed in more detail in later sections.

Process Control System Big Data Appliance

Continuing with FIG. 1, in the example big data process control network 100, the process control big data apparatus or appliance 102 is centralized within the network 100, and is configured to receive data (e.g., via streaming and/or via some other protocol) from the nodes 108 of the network 100 and to store the received data. As such, the process control big data apparatus or appliance 102 may include a data storage area 120 for historizing or storing the data that is received from the nodes 108, a plurality of appliance data receivers 122, and a plurality of appliance request servicers 125. Each of these components 120, 122, 125 of the process control big data appliance 102 is described in more detail below.

The process control system big data storage area 120 may comprise multiple physical data drives or storage entities, such as RAID (Redundant Array of Independent Disks) storage, cloud storage, or any other suitable data storage technology that is suitable for data bank or data center storage. However, the data storage area 120 has the appearance of a single or unitary logical data storage area or entity to the nodes 108 of the network 100. As such, the data storage 120 may be viewed as a centralized big data storage area 120 for the process control big data network 100 or for the process plant 10. In some cases, a single logical centralized data storage area 120 may service multiple process plants (e.g., the process plant 10 and another process plant). For example, a centralized data storage area 120 may service several refineries of an energy company. If desired, the centralized data storage area 120 may be directly connected to the backbone 105, via for example at least one high-bandwidth communication link. Additionally, the centralized data storage area 120 may include an integral firewall.

The structure of the unitary, logical data storage area 120 may support the storage of all process control system related data. For example, each entry, data point, or observation of the data storage entity may include an indication of the identity of the data (e.g., source, device, tag, location, etc.), a content of the data (e.g., measurement, value, etc.), and a timestamp indicating a time at which the data was collected, generated, received or observed. As such, these entries, data points, or observations are referred to herein as "time-series data." The data may be stored in the data storage area 120 using a common format including a schema that supports scalable storage, streamed data, and low-latency queries, for example.

If desired, the schema may include storing multiple observations in each row, and using a rowkey with a custom hash to filter the data in the row. The hash may be based on the timestamp and a tag. For example, the hash may be a rounded value of the timestamp, and the tag may correspond to an event or an entity of or related to the process control system. Additionally, the data storage area 120 may also store metadata corresponding to each row or to a group of rows, either integrally with the time-series data or separately from the time-series data. For example, the metadata may be stored in a schema-less manner separately from the time-series data.

The schema used for storing data at the appliance data storage 120 may also be utilized for storing data in the cache $M_X$ of at least one of the nodes 108. Accordingly, the schema may be maintained when data is transmitted from the local storage areas $M_X$ of the nodes 108 across the backbone 105 to the process control system big data appliance data storage 120.

In addition to the data storage 120, the process control system big data appliance 102 may further include one or more appliance data receivers 122, each of which is configured to receive data packets from the backbone 105, process the data packets to retrieve the substantive data and timestamp carried therein, and store the substantive data and timestamp in the data storage area 120. The appliance data receivers 122 may reside on a plurality of computing devices or switches, for example. Multiple appliance data receivers 122 (and/or multiple instances of at least one data receiver 122) may operate in parallel on multiple data packets.

If the received data packets include the schema utilized by the process control big data appliance data storage area 120, the appliance data receivers 122 may populate additional entries or observations of the data storage area 120 with the schematic information (and, may optionally store corresponding metadata, if desired). In contrast, if the received data packets do not include the schema utilized by the process control big data appliance data storage area 120, the appliance data receivers 122 may decode the packets and populate time-series data observations or data points of the process control big data appliance data storage area 120 (and, optionally corresponding metadata) accordingly.

Additionally, the process control system big data appliance 102 may include one or more appliance request servicers 125, each of which is configured to access time-series data and/or metadata stored in the process control system big data appliance storage 120, e.g., per the request of a requesting entity or application. The appliance request servicers 125 may reside on a plurality of computing devices or switches, for example. At least some of the appliance request servicers 125 and the appliance data receivers 122 may reside on the same computing device or devices (e.g., on an integral device), or are included in an integral application.

Multiple appliance request servicers 125 (and/or multiple instances of at least one appliance request servicer 125) may operate in parallel on multiple requests from multiple requesting entities or applications. As such, a single appliance request servicer 125 may service multiple requests, such as multiple requests from a single entity or application, or multiple requests from different instances of an application.

Figure 3:
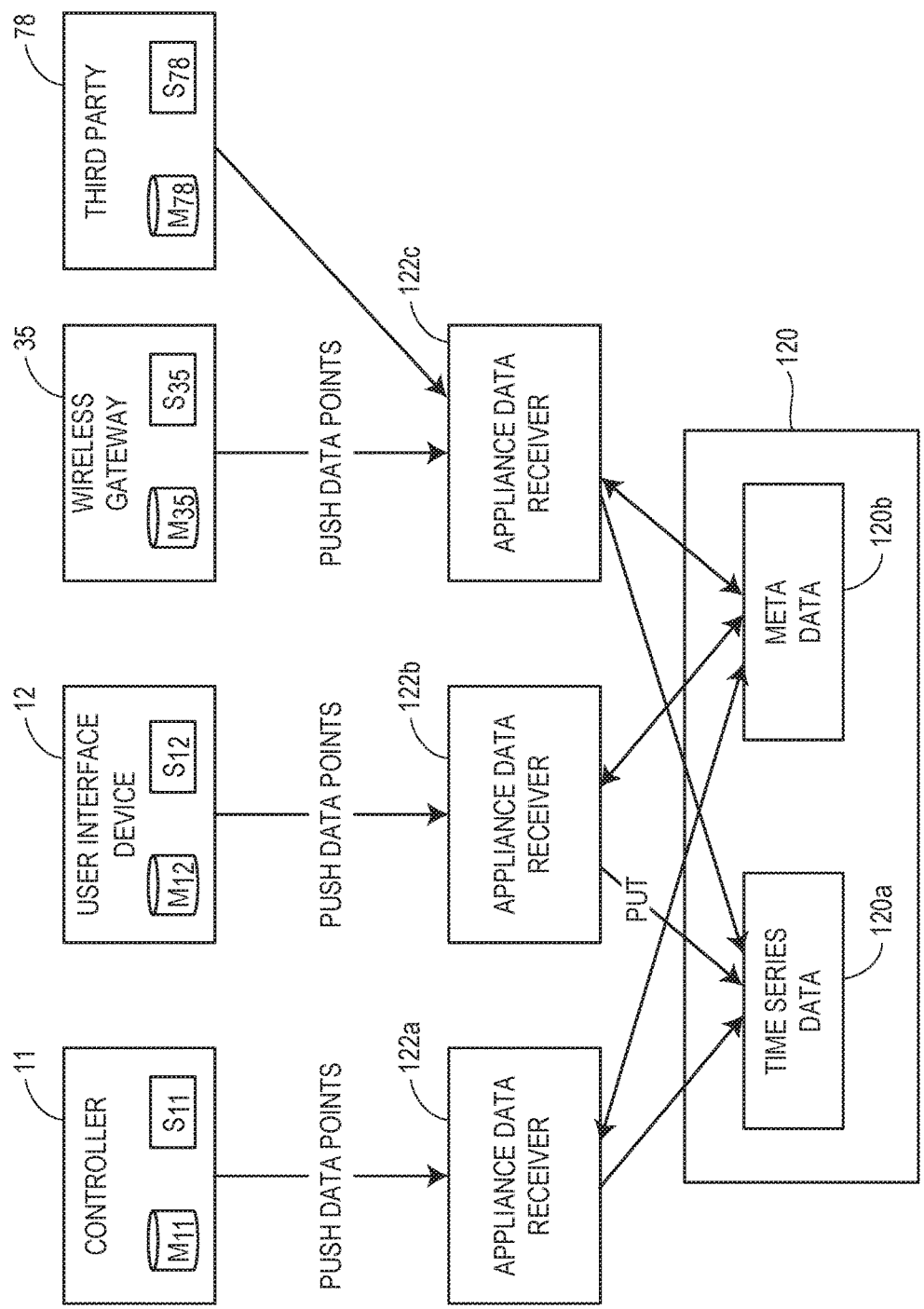
FIG. 3 is a block diagram illustrating an example use of appliance data receivers to store or historize data at the process control system big data appliance of FIG. 1.
Figure 4:
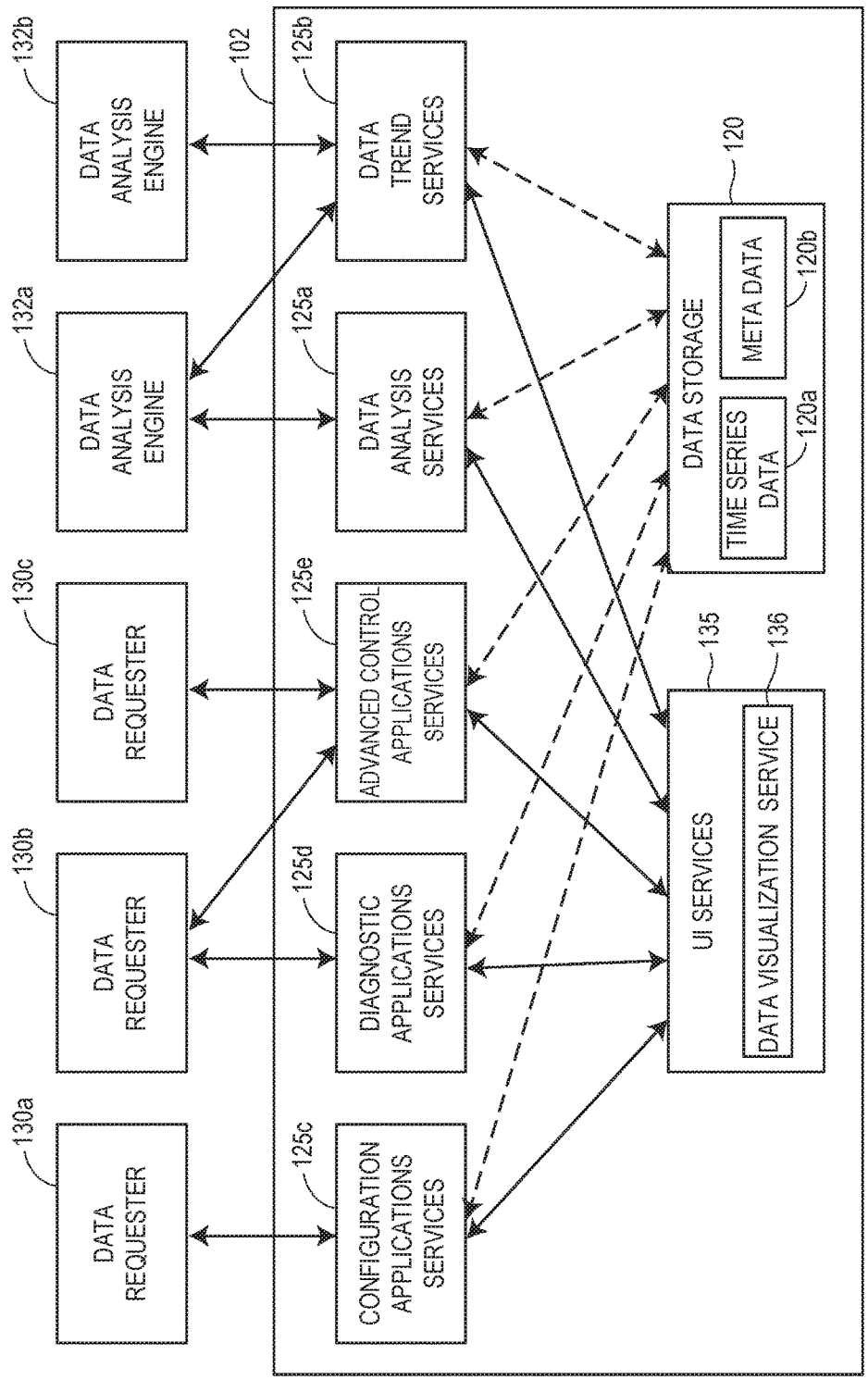
FIG. 4 is a block diagram illustrating an example use of appliance request servicers to access historized data stored at the process control system big data appliance of FIG. 1.

FIGS. 3 and 4 are example block diagrams illustrating further techniques that the appliance data receivers 122 and the appliance request servicers 125 of the process control system big data appliance 102 may implement.

FIG. 3 is an example block diagram illustrating the use of the appliance data receivers 122 to transfer data (e.g., streamed data) from the nodes 108 of the process control big data network 100 to the big data appliance 102 for storage and historization. FIG. 3 illustrates four example nodes 108 of FIG. 1, i.e., the controller 11, a user interface device 12, the wireless gateway 35, and a gateway to a third party machine or network 78. However, the techniques and concepts discussed with respect to FIG. 3 may be applied to any type and any number of the nodes 108. Additionally, although FIG. 3 illustrates only three appliance data receivers 122a, 122b and 122c, the techniques and concepts corresponding to FIG. 3 may be applied to any type and any number of appliance data receivers 122.

As illustrated in FIG. 3, each of the nodes 11, 12, 35 and 78 includes a respective scanner $S_{11}$, $S_{12}$, $S_{35}$, $S_{78}$ to capture data that is generated, received or otherwise observed by the node 11, 12, 35 and 78. A respective processor $P_{MCX}$ of the respective node 11, 12, 35, 78 may execute the functionality of each scanner $S_{11}$, $S_{12}$, $S_{35}$, $S_{78}$. The scanner $S_{11}$, $S_{12}$, $S_{35}$, $S_{78}$ may cause the captured data and a corresponding timestamp to be temporarily stored or cached in a respective local memory $M_{11}$, $M_{12}$, $M_{35}$, $M_{78}$, for example, in a manner such as previously described. As such, the captured data includes time-series data or real-time data. Each of the memories $M_{11}$, $M_{12}$, $M_{35}$ and $M_{78}$ may store and cache the captured data using the schema utilized by the process control big data storage area 120.

Each node 11, 12, 35 and 78 may transmit at least some of the cached data to one or more appliance data receivers 122a-122c (e.g., using the network backbone 105). For example, at least one node 11, 12, 35, 78 may push at least some of the data from its respective memory $M_X$ when the cache is filled to a particular threshold. The threshold of the cache may be adjustable, and at least one node 11, 12, 35, 78 may push at least some of data from its respective memory $M_X$ when a resource (e.g., a bandwidth of the network 105, the processor $P_{MCX}$, or some other resource) is sufficiently available. An availability threshold of a particular resource may be adjustable.

Moreover, at least one node 11, 12, 35, 78 may push at least some of the data stored in the memories $M_X$ at periodic intervals. The periodicity of a particular time interval at which data is pushed may be based on a type of the data, the type of pushing node, the location of the pushing node, and/or other criteria. The periodicity of a particular time interval may be adjustable, and at least one node 11, 12, 35, 78 may provide data in response to a request (e.g., from the process control big data appliance 102).

At least one of the nodes 11, 12, 35, 78 may stream at least some of the data in real-time as the data is generated, received or otherwise observed by each node 11, 12, 35, 78 (e.g., the node may not temporarily store or cache the data, or may store the data for only as long as it takes the node to process the data for streaming). For example, at least one of the nodes 11, 12, 35, 78 may stream at least some of the data to the one or more appliance data receivers 122 using a streaming protocol. Hence, a node 11, 12, 35, 78 may host a streaming service, and at least one of the data receivers 122 and/or the data storage area 120 may subscribe to the streaming service.

Accordingly, transmitted data may be received by one or more appliance data receivers 122a-122c, e.g., via the network backbone 105. A particular appliance data receiver 122 may be designated to receive data from one or more particular nodes, or a particular appliance data receiver 122 may be designated to receive data from only one or more particular types of devices (e.g., controllers, routers, or user interface devices). Further, a particular appliance data receiver 122 may be designated to receive only one or more particular types of data (e.g., network management data only or security-related data only).

The appliance data receivers 122a-122c may cause the big data appliance storage area 120 to store or historize the data. For example, the data storage area 120 may store the data received by each of the appliance data receivers 122a-122c using the process control big data schema. As illustrated in FIG. 3, the time series data 120a is stored separately from corresponding metadata 120b, although in some implementations, at least some of the metadata 120b may be integrally stored with the time series data 120a.

The data storage area 120 may integrate data that is received via the plurality of appliance data receivers 122a-122c so that data from multiple sources may be combined (e.g., into a same group of rows of the data storage area 120). Data that is received via the plurality of appliance data receivers 122a-122c may be cleaned to remove noise and inconsistent data. An appliance data receiver 122 may perform data cleaning and/or data integration on at least some of the received data before the received data is stored, and/or the process control system big data appliance 102 may clean some or all of the received data after the received data has been stored in the storage area 102. A device or node 110, 112, 115 may cause additional data related to the data contents to be transmitted, and the appliance data receiver 122 and/or the big data appliance storage area 120 may utilize this additional data to perform data cleaning. A node 110, 112, 115 may clean (at least partially) at least some data prior to the node 110, 112, 115 causing the data to be transmitted to the big data appliance storage area 120 for storage.

FIG. 4 depicts an example block diagram illustrating the use of appliance request servicers 125 to access the historized data stored at the data storage area 120 of the big data appliance 102. FIG. 4 includes a set of appliance request servicers or services 125a-125e that are each configured to access time-series data 120a and/or metadata 120b per the request of a requesting entity or application, such as a data requester 130a-130c or a data analysis engine 132a-132b. While FIG. 4 illustrates five appliance request servicers 125a-125e, three data requesters 130a-130c, and two data analysis engines 132a, 132b, the techniques and concepts discussed herein with respect to FIG. 4 may be applied to any number and any types of appliance request servicers 125, data requesters 130, and/or data analysis engines 132.

At least some of the appliance request servicers 125 may each provide a particular service or application that requires access to at least some of the data stored in the process control big data storage area 120. For example, the appliance request servicer 125a may be a data analysis support service, and the appliance request servicer 125b may be a data trend support service. Other examples of services 125 that may be provided by the process control system big data appliance 102 may include a configuration application service 125c, a diagnostic application service 125d, and an advanced control application service 125e. An advanced control application service 125e may include, for example, model predictive control, batch data analytics, continuous data analytics or other applications that require historized data for model building and other purposes. The process control system big data appliance 102 may include other request servicers 125 to support other services or applications, e.g., a communication service, an administration service, an equipment management service, a planning service, and other services.

A data requester 130 may be an application that requests access to data that is stored in the process control system big data appliance storage area 120. Based on a request of the data requester 130, the corresponding data may be retrieved from the process control big data storage area 120, and may be transformed and/or consolidated into data forms that are usable by the requester 130. One or more appliance request servicers 125 may perform data retrieval and/or data transformation on at least some of the requested data. The big data appliance 102 further supports casual data access, such as via a user requesting data access casually and repeatedly with variances. In particular, the big data appliance 102 may support privileged APIs that enable more granular and versatile access to the process control big data storage area 120.

At least some of the data requesters 130 and/or at least some of the request servicers 125 may be web services or web applications that are hosted by the process control system big data appliance 102 and that are accessible by nodes of the process control system big data network 100 (e.g., user interface devices 112 or provider devices 110). Accordingly, at least some of the devices or nodes 108 may include a respective web server to support a web browser, web client interface, or plug-in corresponding to a data requester 130 or to a request servicer 125. For user interface devices 112 in particular, a data requester 130 or a request servicer 125 may pull displays and stored data through a User Interface (UI) service layer 135. The UI service layer 135 includes a data visualization service 136 that facilitates the display of various process control data. In particular, the data visualization service 136 may represent various portions of process control data in pictures, charts, maps, reports, presentations, and/or the like. Accordingly, a user accessing any of the data visualization channels may be able to quickly ascertain certain data, trends, relationships, or conclusions associated with the process control data. The data visualization service 136 supports dynamic updating whereby the data visualization service 136 may update corresponding charts or visualizations based on user input, added or removed data, and/or other factors.

A data analysis engine 132 may be an application that performs a computational analysis on at least some of the time-series data points stored in the appliance storage area 120 to generate knowledge or observations. As such, a data analysis engine 132 may generate a new set of data points or observations. The new knowledge, new observations, or new data points may provide a posteriori analysis of aspects of the process plant 10 (e.g., diagnostics or trouble shooting), and/or may provide a priori predictions (e.g., prognostics) corresponding to the process plant 10. In one case, a data analysis engine 132 may perform data mining on a selected subset of the stored data 120, and may perform pattern evaluation on the mined data to generate the new knowledge or new set of data points or observations. Of course, multiple data analysis engines 132 or instances thereof may cooperate to generate the new knowledge or new set of data points.

The new knowledge or set of data points may be stored in (e.g., added to) the appliance storage area 120, for example, and may additionally or alternatively be presented at one or more user interface devices 112. The new knowledge may also be incorporated into one or more control strategies operating in the process plant 10, if desired. A particular data analysis engine 132 may be executed when indicated by a user (e.g., via a user interface device 112), and/or the particular data analysis engine 132 may be executed automatically by the process control system big data appliance 102.

Generally, the data analysis engines 132 of the process control system big data appliance 102 may operate on the stored data to determine time-based relationships between various entities and providers within and external to the process plant 10, and may utilize the determined time-based relationship to control one or more processes of the plant 10 accordingly. As such, the process control system big data appliance 102 allows for one or more processes to be coordinated with other processes and/or to be adjusted over time in response to changing conditions and factors. The process control system big data appliance 102 may automatically determine and execute the coordination and/or adjustments as conditions and events occur, thus greatly increasing efficiencies and optimizing productivity over known prior art control systems.

Examples of possible scenarios in which the knowledge discovery techniques of data analysis engines 132 abound. In one example scenario, a certain combination of events leads to poor product quality when the product is eventually generated at a later time (e.g., several hours after the occurrence of the combination of events). The operator is usually ignorant of the relationship between the occurrence of the events and the product quality. Rather than detecting and determining the poor product quality several hours hence and trouble-shooting to determine the root causes of the poor product quality (as is currently done in known process control systems), the process control system big data appliance 102 (and, in particular, one or more of the data analysis engines 132 therein) may automatically detect the combination of events at or shortly after their occurrence, e.g., when the data corresponding to the events' occurrences is transmitted to the appliance 102. The data analysis engines 132 may predict the poor product quality based on the occurrence of these events, may alert an operator to the prediction, and/or may automatically adjust or change one or more parameters or processes in real-time to mitigate the effects of the combination of events. For example, a data analysis engine 132 may determine a revised set point or revised parameter values and cause the revised values to be used by provider devices 110 of the process plant 10. In this manner, the process control system big data appliance 102 allows problems to be discovered and potentially mitigated much more quickly and efficiently as compared to currently known process control systems.

In another example scenario, at least some of the data analysis engines 132 may be utilized to detect changes in product operation. For instance, the data analysis engines 132 may detect changes in certain communication rates, and/or from changes or patterns of parameter values received from a sensor or from multiple sensors over time which may indicate that system dynamics may be changing. In yet another example scenario, the data analysis engines 132 may be utilized to diagnose and determine that a particular batch of valves or other supplier equipment are faulty based on the behavior of processes and the occurrences of alarms related to the particular batch across the plant 10 and across time.

In another example scenario, at least some of the data analysis engines 132 may predict product capabilities, such as vaccine potency. In yet another example scenario, the data analysis engines 132 may monitor and detect potential security issues associated with the process plant 10, such as increases in log-in patterns, retries, and their respective locations. In still another example scenario, the data analysis engines 132 may analyze data aggregated or stored across the process plant 10 and one or more other process plants. In this manner, the process control system big data appliance 102 allows a company that owns or operates multiple process plants to glean diagnostic and/or prognostic information on a region, an industry, or a company-wide basis.

Big Data Schema for Process Control Data

The big data appliance 102 is configured to use non-relational database mechanisms of a big data schema to store process control data. The non-relational database mechanisms enable design simplicity, horizontal scaling, and finer control over data availability. Generally, the non-relational structure of the big data schema leverages one or more tables to store process control data received from various control system components or modules. The structure of the big data schema enables efficient storage as a result of the tables only storing actual measurements or values (i.e., the tables do not have empty cells), thereby reducing the amount of total storage required by the tables. Further, the organization of the tables enables the use of multiple types of queries to efficiently locate and access stored data.

Generally, each table includes one or more rowkeys, column families, and column qualifiers. Each rowkey serves as a primary key for the corresponding table. The big data appliance 102 examines one or more fields of a received process variable to determine the rowkey to which the process variable should be associated. A column family groups one or more related columns that specify how the process variable should be associated with the rowkey. In particular, each column of a column family specifies one or more column qualifiers corresponding to fields or attributes of the received process variables. An administrator or user may specify the various column families and the column qualifiers thereof. The column qualifiers have one or more values that can result in multiple entries for the same rowkey, therefore resulting in a three-dimensional storage scheme. In some cases, the column qualifiers can correspond to fields or attributes already included in the received process control data. In other cases, the big data appliance 102 can determine or identify the column qualifiers upon receipt of the process control data.

The rowkeys and the column qualifiers can include one or more fields or attributes, or combinations thereof, of the process control data, such as one or more of a timestamp (or a portion thereof), an identification of a process variable, the measurement or value of the process control data, a type of data (e.g., Boolean, integer, etc.), a status of the process variable (e.g., "good," "bad," "absent," etc.), and/or others. For example, each rowkey of a table can be a concatenation of an identification of a process variable and a portion of the timestamp corresponding to when the process variable was recorded, and the column qualifiers of the table can be a concatenation of the type of the process variable, the status of the process variable, and an additional portion of the timestamp, whereby the table stores the measurement value of the process variable in the appropriate data field. For further example, each rowkey of a table can be a concatenation of the type of the process variable and the measurement value of the process variable, and the column qualifiers can be a concatenation of the identification of the process variable and the timestamp, whereby the table stores the status of the process variable in the appropriate data field.

Generally, the big data appliance 102 collects many types of data (e.g., continuous, batch, event, operator-entered values, etc.) from a process control plant and from other sources such as lab systems and material handling systems. For example, the big data appliance 102 collects data such as process variable values, setpoints, discrete inputs and outputs, process alarms, maintenance alarms, operator actions, batch actions, end of batch data, insight models and statistics, and/or the like. The big data appliance 102 automatically buffers the collected data in local memory or storage without requiring any user input or configuration, and periodically transfers the data to a real-time database. Because the big data appliance 102 collects data at the rate at which the associated module of the process control plant is executed, the big data appliance 102 enables a complete history of the process control plant operation to be available to support various analyses.

The big data appliance 102 further leverages a time series database server (TSDS) of the data storage area 120 to store, index, and serve process control data and other related data collected from various control system components (e.g., control strategies, control system equipment, devices, lab systems, applications, etc.) at a large scale and to enable effective retrieval of the data. The TSDS is able to serve up data for traditional applications such as operational historians, and to collect and serve up infrastructure data related to the process control devices and equipment.

The time-series data may be thought of as a collection of data points or tuples, whereby each data point can have a timestamp and a measurement. The TSDS may collect the measurements at regular or irregular intervals, for example at the execution rate of the associated control module. For instance, the TSDS may collect a process variable and an associated status for all analog input points. In some cases, the data points can include metadata indicating the measurement, such as the fully-qualified tag generating the time series, the range on the data, and other data. By appending a timestamp to a value or to a measurement and its status, patterns and differences between and among measurement values over time can be better ascertained. For example, if a current temperature at a specific location is measured every hour, future temperatures can be more easily predicted based on one or more of the measured temperatures. Further, by maintaining the timestamp, location, and measurement information as part of a control hierarchy, the TSDS may store these relationships in the database as metadata and update the relationships as the hierarchy is updated.

Figure 5A:
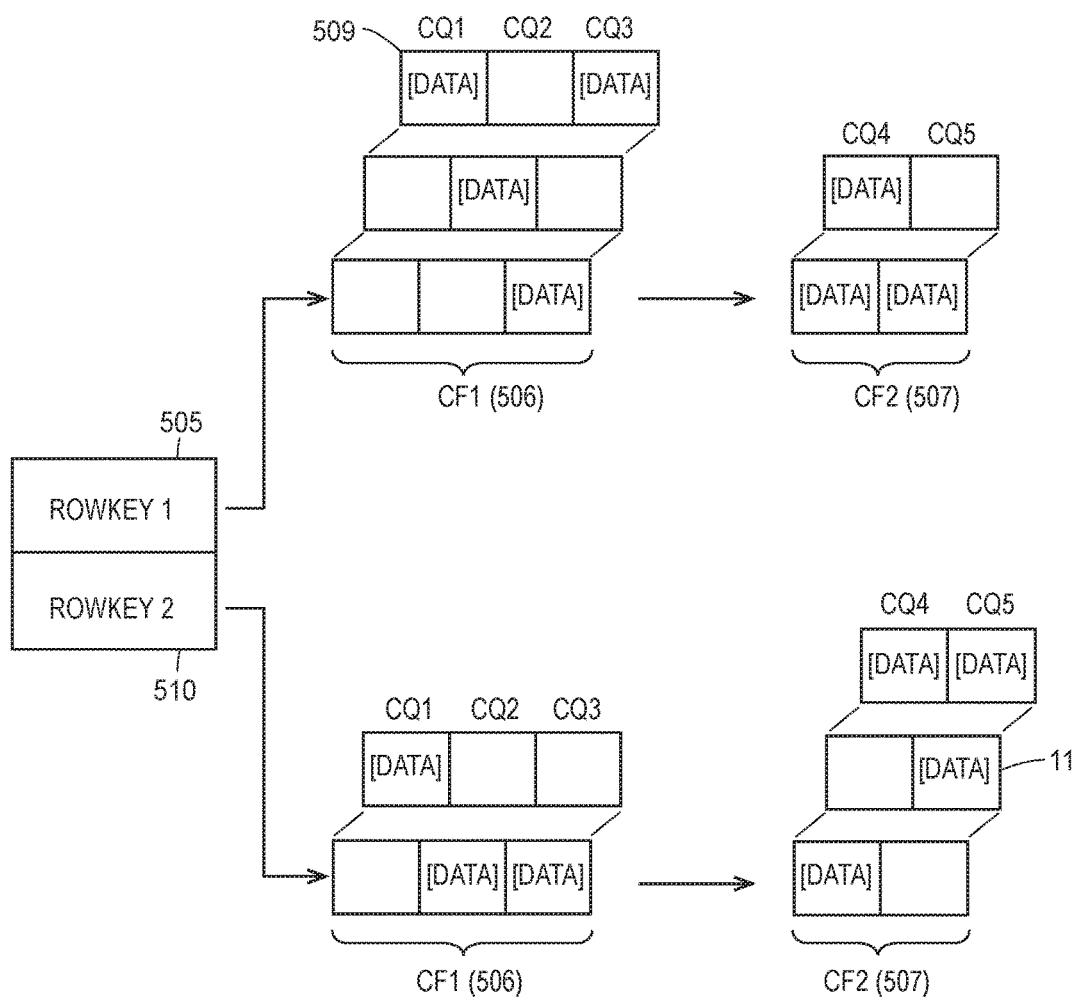
FIG. 5A is an example table for organizing and storing big data.

As discussed herein, the big data appliance 102 implements the big data storage schema using one or more tables. FIG. 5A depicts a structure of an example table 500 configured to store process control data. The big data appliance 102 stores the example table 500 in the process control system big data storage 120. The example table 500 includes a first rowkey 505 ("ROWKEY 1") and a second rowkey 510 ("ROWKEY 2"). Each of the first rowkey 505 and the second rowkey 510 has an associated first column family 506 ("CF1") and a second column family 507 ("CF2"). The first column family 506 has three (3) associated column qualifiers ("CQ1," "CQ2," and "CQ3") and the second column family 507 has two (2) associated column qualifiers ("CQ4" and "CQ5"). Because each of the rowkeys 505, 510 has multiple column qualifiers with multiple potential values, each rowkey 505, 510 may contiguously store multiple entries, as illustrated in FIG. 5A.

The big data appliance 102 examines received process control data to determine how to store the data. In some cases, the big data appliance 102 examines the process control data to identify attributes corresponding to the rowkey (or a portion thereof), or to one or more column qualifiers. For example, the process control data can include an identification of the process variable and a status of the process variable. In other cases, the big data appliance 102 appends data to the received process control data, wherein the appended data corresponds to the rowkey (or a portion thereof), or to one or more column qualifiers. For example, the big data appliance 102 may generate a timestamp corresponding to when the big data appliance 102 received the process control data. Accordingly, the big data appliance 102 may build the rowkeys and/or column qualifiers using the identified or generated attributes of the process control data. Further, the big data appliance 102 may store the process control data (or measurements or values thereof) according to the built rowkeys and column qualifiers.

Generally, the big data appliance 102 does not allocate memory segments of the table 500 prior to storing data in the table 500. Instead, the big data appliance 102 is configured to store data associated with the process variable (e.g., the measurement or value) in the table 500 according to the corresponding rowkey, column family, and column qualifiers. Further, the big data appliance 102 stores the data as the process control data is received and processed. For example, the big data appliance 102 stores data 509 in a memory segment corresponding to the first rowkey 505, the first column family 506, and CQ1 of a certain value; and the big data appliance 102 stores data 511 in a memory segment corresponding to the second rowkey 501, the second column family 507, and CQ5 of a certain value. The remaining fields of the table are null or otherwise unallocated, thus conserving memory space in the big data schema.

In an example implementation, the big data appliance 102 orders the rowkeys according to a timestamp of the corresponding process control data and process variables thereof. The timestamp may correspond to when a device recorded the process control data, when the device transmitted the process control data, when the big data appliance 102 received the process control data, or other times. Further, the big data appliance 102 may round the timestamp down or up by a predetermined degree. For example, timestamp may be rounded down or up to the nearest minute, hour, day, or the like. As a result, the big data appliance 102 may store multiple columns having timestamps that are included in the rounded timestamp of the corresponding rowkey. By storing multiple columns per rowkey, searching the process control system big data storage 120 is more efficient and effective. In particular, this structure enables more data to be disqualified in a single exclusion and the overall number of rows that are tracked by rowkey to be reduced. Further, by using the rounded time as a part of the hash, an administrator may partition the big data schema more effectively.

Figure 5B:
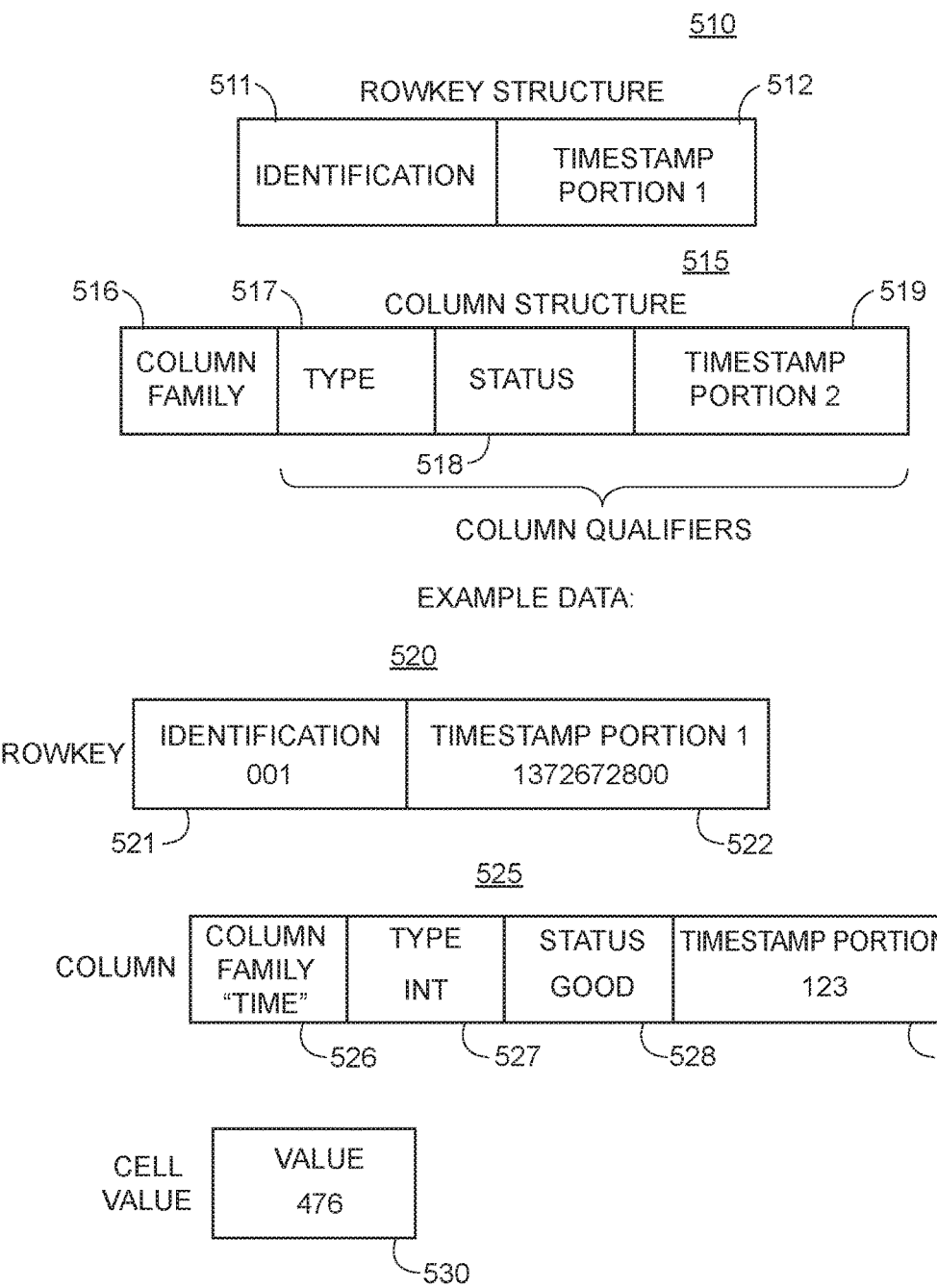
FIG. 5B is an example structure of an example table for organizing and storing big data.

FIG. 5B illustrates an example rowkey and column qualifier for an example table, as well as example process control data related thereto. As illustrated in FIG. 5B, an example rowkey structure 510 includes an identification 511 and a first timestamp portion 512. The identification 511 is a certain amount of bytes (e.g., 3 bytes) and uniquely identifies the received process variable. In some cases, the big data appliance 102 may generate the identification 511 and store the identification 511 in a look-up table. The first timestamp portion 512 is a certain amount of bytes (e.g., 4 bytes) and corresponds to a timestamp that is rounded by a predetermined degree. For example, the first timestamp portion 512 may be a "high order" timestamp resulting from rounding a timestamp down to the nearest hour. Because the big data appliance 102 may receive a particular process variable having the same identification at multiple times, the big data appliance 102 may store a grouping of rows for the particular identification and order the rows according to the timestamps. Accordingly, a single row can store a "bucket" of measurements (e.g., if the first timestamp portion 812 corresponds to an hour, the associated rowkey 810 can store measurements collected within that hour).

FIG. 5B further includes an example column structure 515 having a column family 516 and three column qualifiers: a type 517, a status 518, and a second timestamp portion 519. As discussed above, the column family 516 identifies or categorizes the column qualifiers. Further, the column qualifiers (i.e., the type 517, the status 518, and the second timestamp portion 519) are attributes associated with the corresponding process control data. In particular, the type 517 identifies the data type of the process variable (e.g., integer, string, number, Boolean, etc.), the status 518 indicates the status of the process variable (e.g., good, bad, absent, etc.), and the second timestamp portion 519 is a remainder of the timestamp resulting from the rounded first timestamp portion 512. The column family 516, the type 517, the status 518, and the second timestamp portion 519 may be of various sizes. For example, the column family 516, the type 517, and the status 518 can each be 1 byte, and the second timestamp portion 519 can be 4 bytes.

FIG. 5B also illustrates an additional example rowkey 520 and an example column 525 populated with example data. As illustrated in FIG. 5B, an identification 521 of the rowkey 520 is "001," a column family 526 of the column 825 is "Time," a type 527 of the column 525 is "INT," and a status 528 of the column 525 is "GOOD." The rowkey 520 and the column 525 also store timestamp data corresponding to a timestamp of Jul. 1, 2013 at 10:02:03 GMT (which produces a corresponding UNIX epoch value of 1372672923). When the timestamp is rounded down to the nearest hour (i.e., rounded to 10:00:00), the timestamp can be split into an upper timestamp 522 having a UNIX epoch value of 1372672800 and a lower timestamp 529 of 123 that represents the "remainder" from rounding down. Accordingly, any data having a timestamp between or including 10:00:00 GMT and 10:59:59 GMT on Jul. 1, 2013 can be stored in a column associated with the rowkey 520 (i.e., any data having an upper timestamp of 1372672800). FIG. 5B further illustrates an example cell value 530 storing a measurement value associated with the column 525 and corresponding process variable. As shown in FIG. 5B, the measurement value of "476" can represent a value of the process variable as collected within the process plant 10.

FIG. 5C depicts an example storage table 531 including example rowkeys 520 and example column qualifiers 535 for an example column family "Time." As illustrated in FIG. 5C, the example rowkeys 520 include a concatenation of a process variable identification and an upper timestamp (e.g., "098.1372672800"). In the example storage table 531, the upper timestamp is rounded to sixty (60) minutes. Each of the example column qualifiers 535 is a concatenation of a type of value, a status of the process variable, and a lower timestamp. For example, the column qualifier REAL.GOOD.+20 has a type REAL, a status GOOD, and a time offset of 20 (i.e., 20 seconds after the rounded upper timestamp of 1372672800). Further, the cells of the storage table 531 store measurements corresponding to a given rowkey and column qualifier. For example, the measurement associated with rowkey 057.1372672800 and column qualifier REAL.GOOD.+40 is 45.4. The table 531 may contiguously store any data corresponding to the same rowkey and column family. For example, the table 531 contiguously stores data corresponding to a particular process variable identification (e.g., 098 or 057) over a 60-minute period.

Generally, to write a measurement, the big data appliance 102 builds the appropriate rowkey with unique data and determines the associated column family and column qualifier(s). Further, the big data appliance 102 identifies which bytes to store in the cell corresponding to the column family and column qualifier(s), and writes the associated record. For example, the table 531 writes the values of the process variables in the associated records. A user or administrator associated with the process control system 10 may query the big data appliance 102 for stored data. In particular, the query may specify a rowkey range as well as define applicable filter criteria, such as an upper timestamp range. The big data appliance 102 may execute the query and return identified results to the querying user.

The big data appliance 102 can employ "snapshot" or "zoom" features to enable users to gauge a long-term view and overall context of the data while still enabling more detailed views of the data. The snapshot or zoom features further enable users to identify snapshots of data corresponding to various timestamp ranges. Using various techniques, the big data appliance 102 can create and store aggregates of the data for specific time periods. For example, the big data appliance 102 can store the minimum, maximum, and closing measurement values for each hour of data (i.e., from measurement values corresponding to a common upper timestamp).

The big data appliance 102 may support Apache Hadoop for storage and large scale processing of the associated data. In some cases, the big data appliance 102 may implement the MapReduce framework associated with the Apache HBase database, which enables users or administrators to reduce data while at the same time enabling the HBase infrastructure to utilize parallel distributed programs. The MapReduce framework enables the division of a dataset and to run it in parallel over multiple nodes. Specifically, the users or administrators may divide the storage problem into simpler Map( ) and Reduce( ) functions for filtering, sorting, and summary operations, while the MapReduce framework automatically marshalls the distributed servers, runs the various tasks in parallel, manages communications and data transfers between the various parts of the system, provides for redundancy and failures, and manages the overall process.

FIG. 5D depicts an example data record created using the "snapshot" techniques as discussed herein. For example, the big data appliance 102 may use the MapReduce framework to create the data record. As illustrated in FIG. 5D, an example rowkey 534 and an example column 535 each includes various fields or attributes of the process control data. In particular, the example rowkey 534 includes an identification of the process variable and an upper timestamp in a scale of year, and the example column 535 includes a column family, a type, a status, and a lower timestamp in a scale of day. In other words, any column having a lower timestamp corresponding to a day in the year specified by the upper timestamp is associated with that corresponding rowkey. FIG. 5D also depicts an example cell value 540 that the big data appliance 102 may store according to a corresponding rowkey and column pair. The example cell value 540 includes an aggregated high value 541, an aggregated low value 542, and an aggregated close value 543. The aggregated high value 541 and the aggregated low value 542 respectively represent the highest and lowest measurement values among the data records with a timestamp corresponding to the upper timestamp of the rowkey 534. Further, the aggregated close value 543 represents the last measurement value (by time) among the data records with a timestamp corresponding to the upper timestamp of the rowkey 534. Although the aggregated high value 541, the aggregated low value 542, and the aggregated close value 543 are depicted in FIG. 5D, it should be appreciated that other snapshot values are envisioned such as, for example, average value, mode value, median value, standard deviation, and/or other values.

Figure 6:
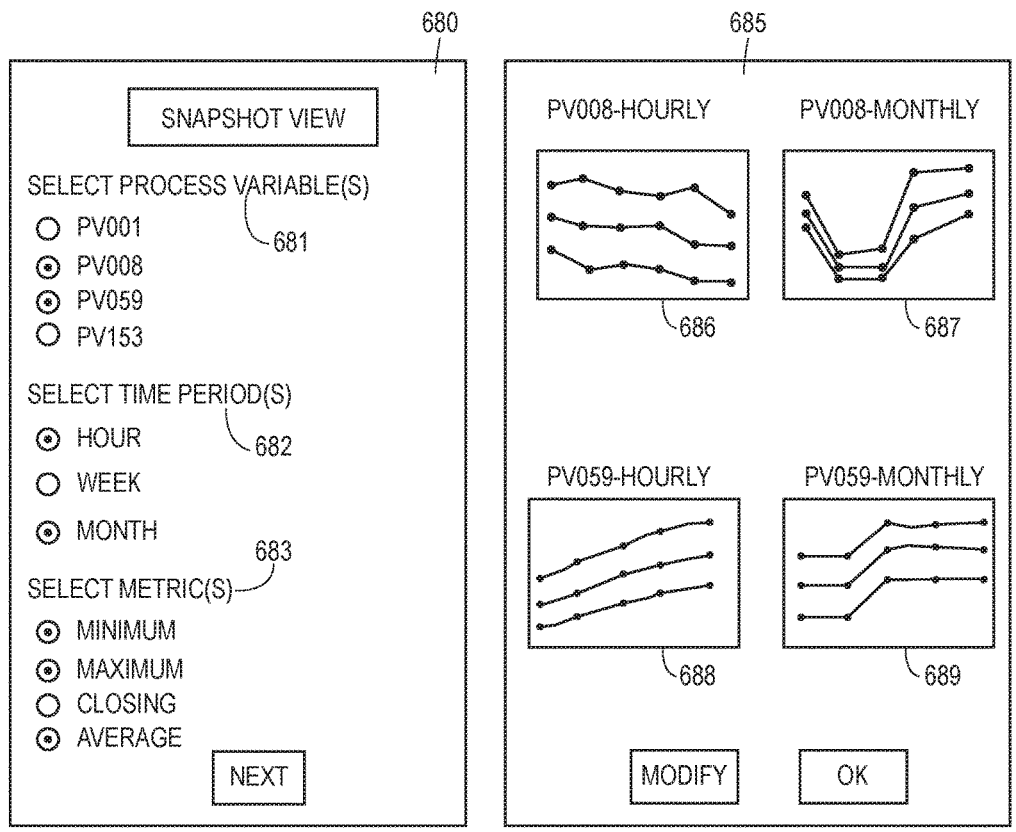
FIG. 6 depicts example user interfaces associated with retrieving and accessing process control data snapshots.

FIG. 6 depicts example interfaces associated with enabling users to view various snapshots of process control data. The big data appliance 102 may employ a data explorer module (or similar module) to enable a user or administrator to select parameters for a snapshot view and then view the corresponding snapshot view. A first interface 680 corresponds to a selection screen to enabling the user to select parameters for a snapshot view. The first interface 680 includes a process variable selection option 681 that enables the user to select one or more process variables with data that the user wishes to view or analyze. The first interface 680 further includes a time period selection option 682 that enables the user to select one or more time periods for the selected process variable data. Further, the first interface 680 includes a metric selection option 683 that enables the user to select one or more various parameters corresponding to the desired "zoom" value for the selected time periods. The first interface 608 depicts selections of process variables "PV008" and "PV059", time periods for hour and month, and minimum, maximum, and average metrics.

A second interface 685 depicts charts resulting from the selections of the first interface 680. In particular, the second interface 685 depicts hourly and monthly charts 686, 687 for process variable "PV008," and hourly and monthly charts 688, 689 for process variable "PV059." The respective hourly charts 686, 688 depict hourly minimum, maximum, and average values for "PV008" and "PV059" over a period of six (6) hours. The respective monthly charts 687, 689 depict monthly minimum, maximum, and average values for "PV008" and "PV059" over a period of five (5) months. Using the first interface 680 and the second interface 685, the user or administrator may effectively and efficiently assess and analyze snapshots of process control data and parameters thereof without having to filter through all of the recorded data.

Figure 7:
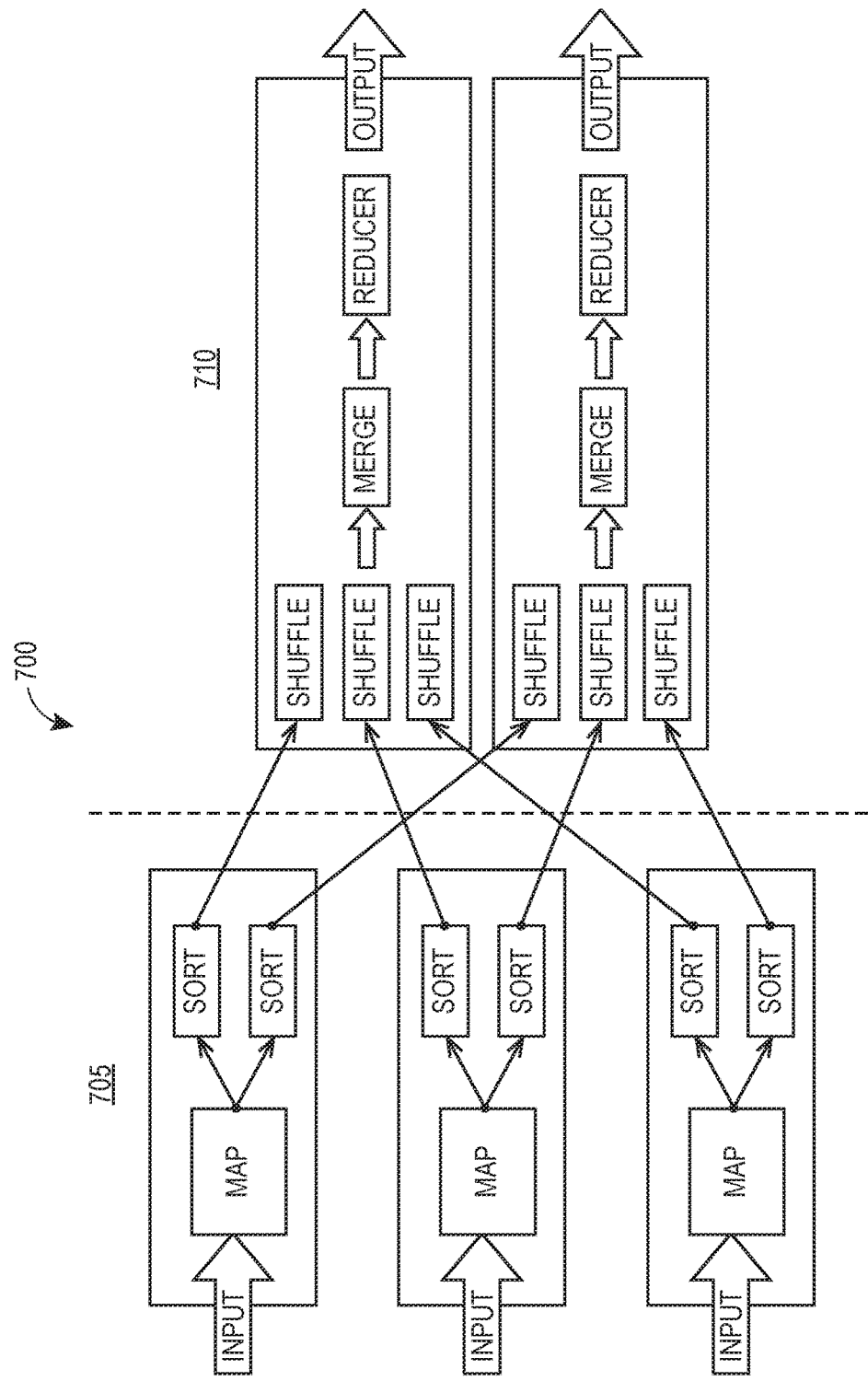
FIG. 7 is a block diagram illustrating an organization technique for big data.

FIG. 7 depicts a flow diagram 700 related to the big data appliance 102 employing a "snapshot" technique (e.g., the MapReduce technique) to aggregate raw data. In 705, the big data appliance 102 maps input data according to the identification for each associated timestamp and then sorts the mapped data according to the identification to generate compiled measurement data corresponding to each identification. In 710, the big data appliance shuffles, merges, and reduces the data into the target output data. For example, the big data appliance can output, for each of the identifications, the high, low, and close measurement values for a specific time period. Thus, the big data appliance can effectively generate the snapshots and provide the snapshots to a requesting user or administrator.

Figure 8:
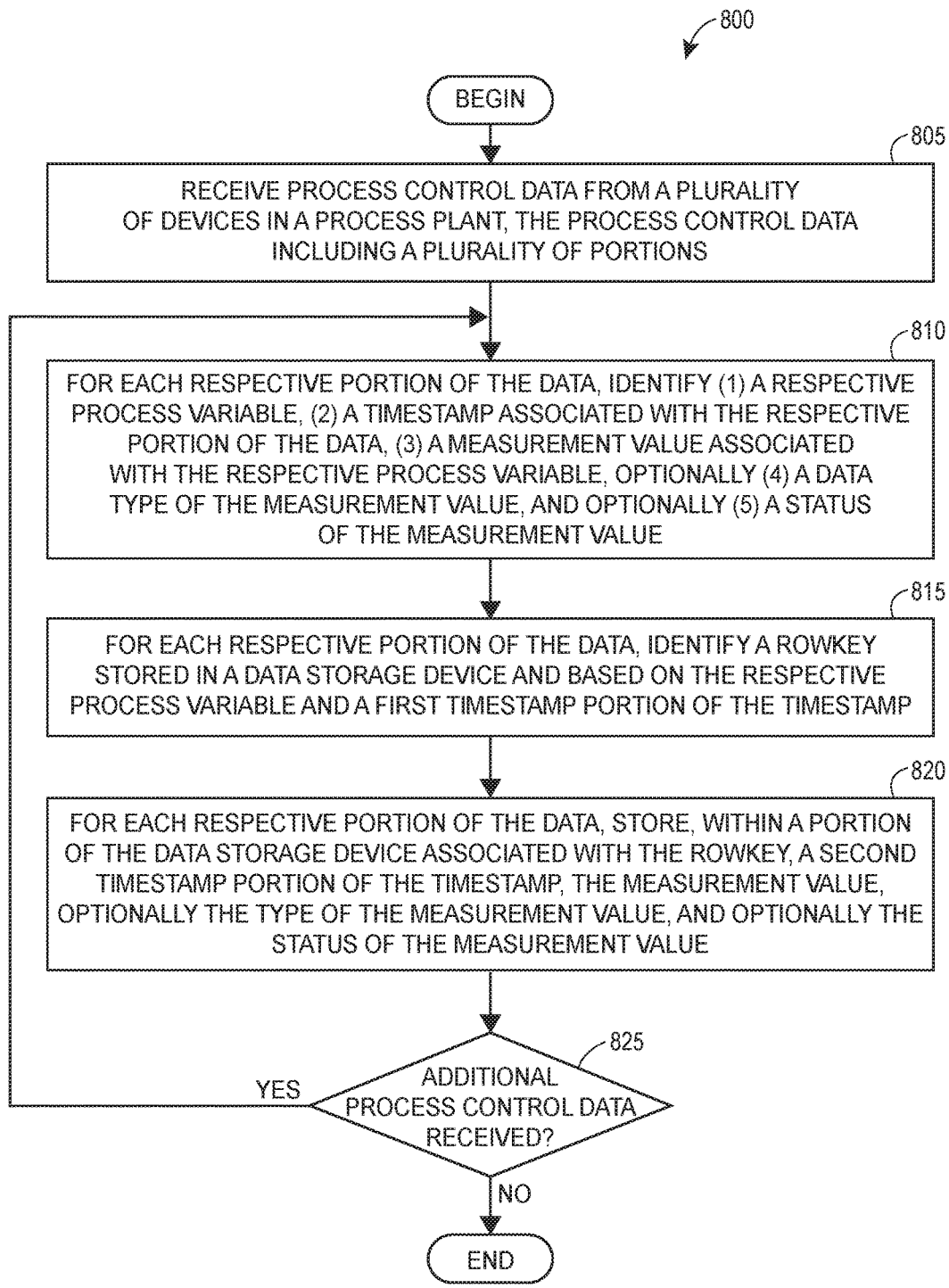
FIG. 8 is a flow diagram of an example method of storing big data using rowkeys.
Figure 9:
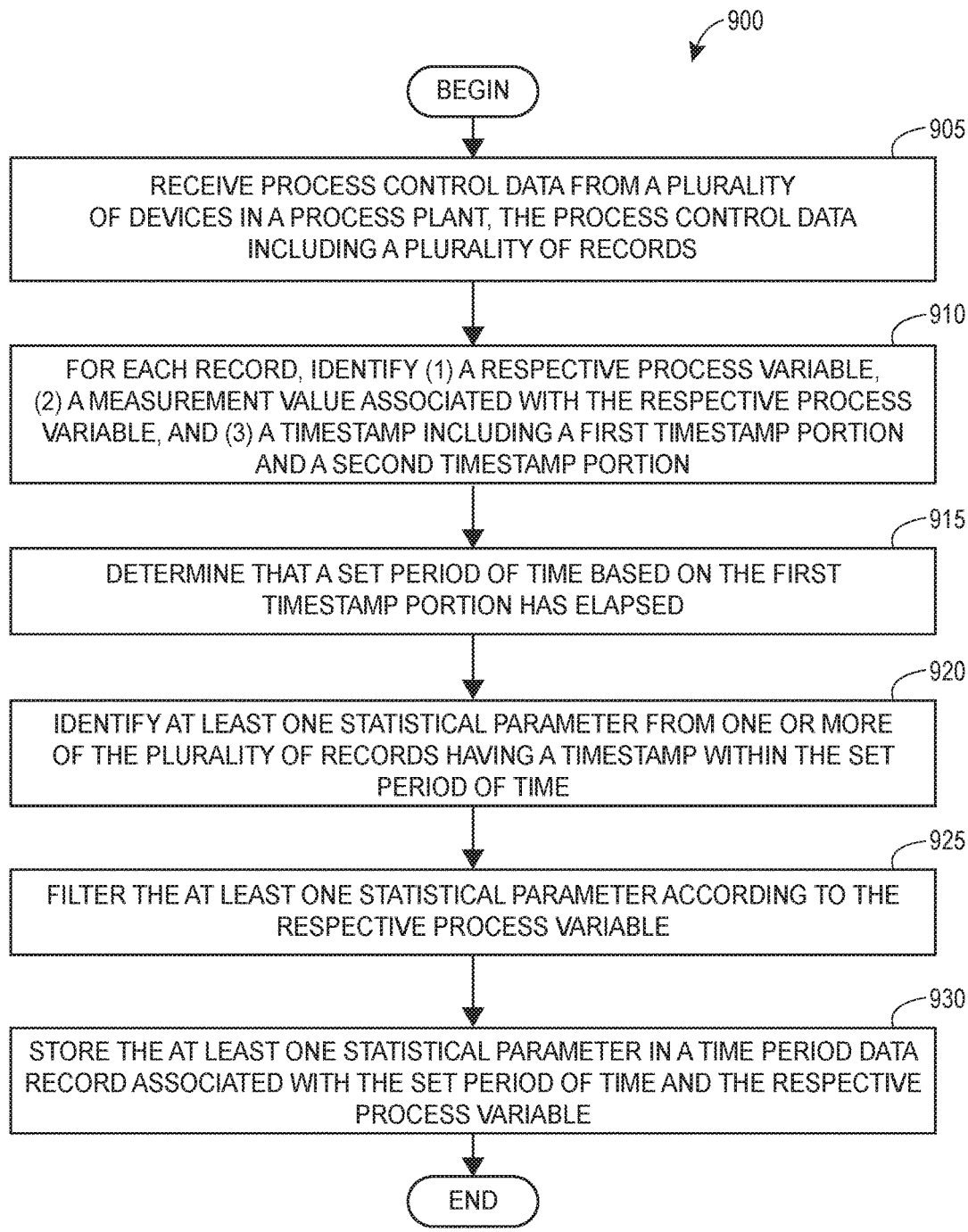
FIG. 9 is a flow diagram of an example method of storing process control data from multiple data records.
Figure 10:
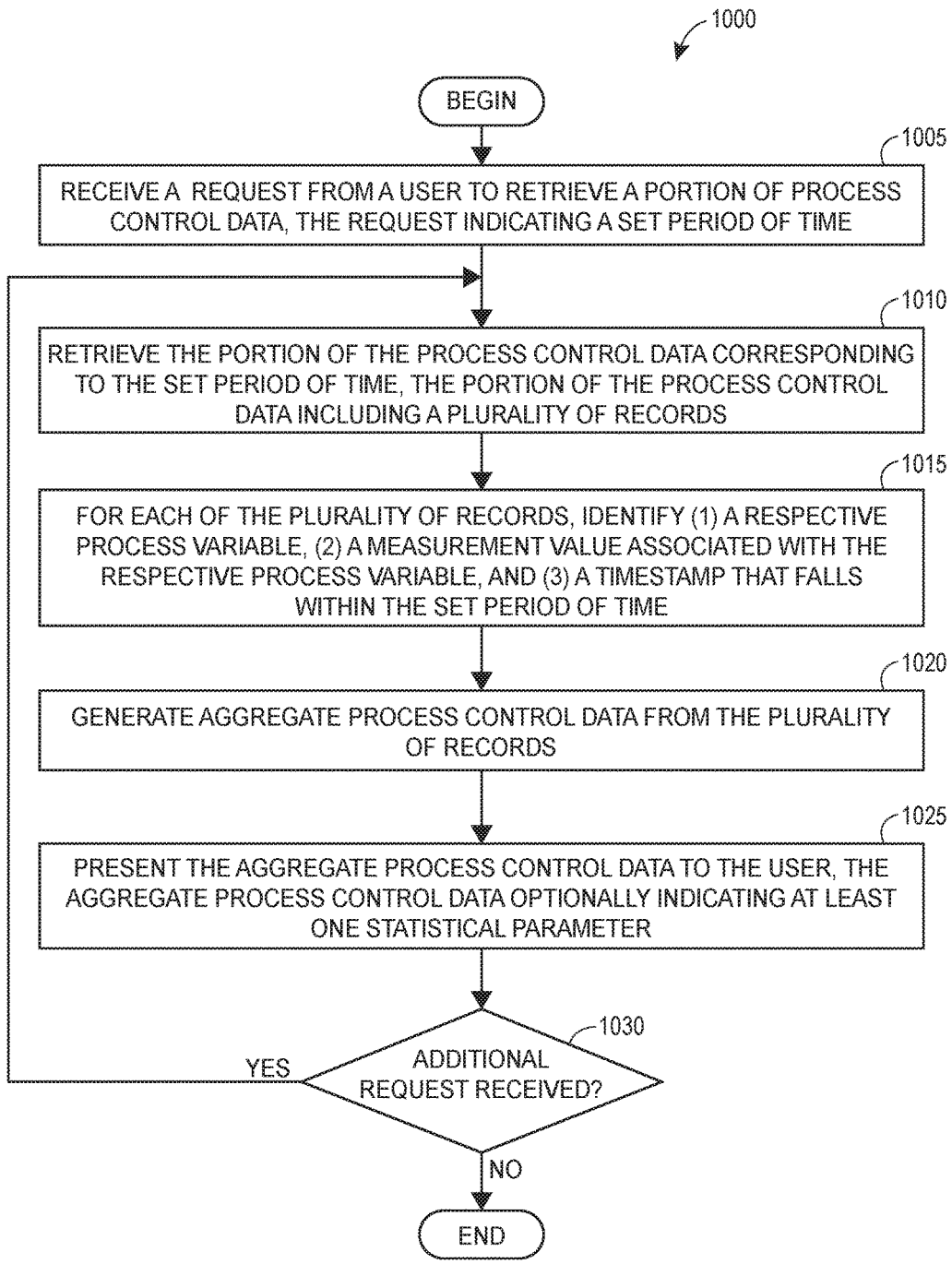
FIG. 10 is a flow diagram of an example method of retrieving process control data from multiple data records and performing calculations therefrom.

FIGS. 8-10 illustrate flow diagrams of example methods 800, 900, 1000 for retrieving, presenting, or otherwise storing big data in a process control system or process plant according to the big data schema as discussed herein. A big data appliance (e.g., the big data appliance 102 of FIG. 1) can implement the methods 800, 900, 1000 in the process control system big data network 100 of FIG. 1, or in any other suitable network or system that supports big data in a process control system or process plant. For illustrative (and non-limiting) purposes, the methods 800, 900, 1000 are discussed below with simultaneous reference to FIGS. 1-7.

Referring to FIG. 8, the method 800 relates to storing process control data in a data storage device. In particular, the method 800 stores the process control data via leveraging rowkeys generated according to timestamps associated with the process control data. At a block 805 of the method 800, the big data appliance receives the process control data, for example via one or more data receivers 122. The data may correspond to a process plant and/or to a process being controlled by a process plant, and may include a plurality of portions or segments. For example, the data may include real-time data generated while controlling a process in the process plant, configuration data, batch data, network management and traffic data of various networks included in the process plant, data indicative of user or operator actions, data corresponding to the operation and status of equipment and devices included in the plant, data generated by or transmitted to entities external to the process plant, and other data.

At a block 810, the big data appliance identifies various data measurements, indications, and other attributes from each respective portion of the received data. For example, the big data appliance may identify, for each respective portion of the data, an identification of a respective process variable, a timestamp associated with the respective portion of the data, a measurement value associated with the respective process variable, a data type of the measurement, and/or a status associated with the measurement value. The timestamp may be represented as a UNIX epoch value, and may include a first timestamp portion reflecting the timestamp rounded down by a certain degree, and a second timestamp portion reflecting a remainder of the timestamp that was rounded down by the certain degree. Accordingly, the first timestamp portion may correspond to an upper timestamp of the timestamp and the second timestamp portion may correspond to a lower timestamp of the timestamp.

At block 815, the big data appliance identifies, for each respective portion of the received data, a rowkey based on the respective process variable and the first timestamp portion. In some cases, the big data appliance may generate the rowkey (e.g., if the particular rowkey does not exist) by concatenating an identification of the respective process variable and the first timestamp portion, and store the rowkey in a data storage device. In other cases, the big data appliance may identify a rowkey already stored in a data storage device that corresponds to the respective process variable and the first timestamp portion.

At block 820, the big data appliance stores, for each respective portion of the data, various data within a portion of the data storage device associated with the rowkey. In some cases, the big data appliance may store the second timestamp portion, the measurement value, optionally the type of the measurement value, and optionally the status of the measurement value. In this regard, the rowkey can include recorded process control data having a timestamp corresponding to the upper timestamp of the rowkey (i.e., data recorded within a period of time indicated by the rowkey), thus reducing the amount of storage necessary to store the process control data and reducing the amount of time needed to access and retrieve the data.

At block 825, the big data appliance determines if additional process control data is received. For example, the additional process control data can be additional process control data recorded by the process control system. If additional process control data is received ("YES"), processing can return to 810 or proceed to any other functionality. If additional process control data is not received ("NO"), processing can end, repeat, or proceed to any other functionality.

Referring to FIG. 9, the method 900 relates to storing process control data according to snapshot conventions that enable users to retrieve snapshot data associated with the process control data. At a block 905 of the method 900, the big data appliance receives process control data, for example via one or more data receivers 122. The data may correspond to a process plant and/or to a process being controlled by a process plant, and may include a plurality of portions. For example, the data may include real-time data generated while controlling a process in the process plant, configuration data, batch data, network management and traffic data of various networks included in the process plant, data indicative of user or operator actions, data corresponding to the operation and status of equipment and devices included in the plant, data generated by or transmitted to entities external to the process plant, and other data.

At a block 910, the big data appliance, for each record, examines the data to identify (1) a respective process variable, (2) a measurement value associated with the respective process variable, and (3) a timestamp including a first timestamp portion and second timestamp portion. The timestamp may be represented as a UNIX epoch value, and may include a first timestamp portion reflecting the timestamp rounded down by a certain degree, and a second timestamp portion reflecting a remainder of the timestamp that was rounded down by the certain degree. Accordingly, the first timestamp portion may correspond to an upper timestamp of the timestamp and the second timestamp portion may correspond to a lower timestamp of the timestamp.

At a block 915, the big data appliance determines that a set period of time based on the first timestamp portion has elapsed. For example, if the first timestamp portion specifies 10:00:00 AM and is rounded to the nearest hour, the set period of time elapses at 11:00:00 AM. In one case, the big data appliance can determine that the set period of time has elapsed by comparing a current time to first timestamp portion.

When the set period of time has elapsed at block 920, the big data appliance identifies at least one statistical parameter from one or more of the plurality of records having a timestamp within the set period of time. The at least one statistical parameter may be one or more of: a high value of the respective one or more measurement values, a low value of the respective one or more measurement values, a most recent value of the respective one or more measurement values, a standard deviation of the respective one or more measurement values, an average of the respective one or more measurement values, and a median of the respective one or more measurement values. It should be appreciated that other statistical parameters associated with the plurality of records are envisioned.

At block 925, the big data appliance filters the at least one statistical parameter according to the respective process variable. In particular, the big data appliance can separate the identified statistical parameter(s) according to the respective process variable such that a user can access or retrieve statistical parameter data according to the specified process variable.

At block 930, the big data appliance stores the at least one statistical parameter in a time period data record associated with the set period of time and the respective process variable. Therefore, the time period data record can store any relevant data corresponding to a specific time period and a user need not review or access individual rowkeys or records to analyze aggregate process control data.

Referring to FIG. 10, the method 1000 relates to retrieving "shapshots" of process control data that enables users to analyze the process control data across specified time periods. At a block 1005 of the method 1000, the big data appliance receives a request from a user to retrieve a portion of process control data, wherein the request indicates a set period of time. The process control data may correspond to a process plant and/or to a process being controlled by a process plant, and may include a plurality of portions. For example, the data may include real-time data generated while controlling a process in the process plant, configuration data, batch data, network management and traffic data of various networks included in the process plant, data indicative of user or operator actions, data corresponding to the operation and status of equipment and devices included in the plant, data generated by or transmitted to entities external to the process plant, and other data.

At block 1010, the big data appliance retrieves the portion of the process control data corresponding to the set period of time wherein the portion of the process control data includes a plurality of records. The set period of time may be defined by an upper timestamp associated with the plurality of records, wherein the plurality of records each indicate a lower timestamp that falls within the set period of time defined by the upper timestamp.

At block 1015, the big data appliance, for each of the plurality of records, identifies (1) a respective process variable, (2) a measurement value associated with the respective process variable, and (3) a timestamp that falls within the set period of time. The timestamp may be represented as a UNIX epoch value, and may include a first timestamp portion reflecting the timestamp rounded down by a certain degree, and a second timestamp portion reflecting a remainder of the timestamp that was rounded down by the certain degree. Accordingly, the first timestamp portion may correspond to an upper timestamp of the timestamp and the second timestamp portion may correspond to a lower timestamp of the timestamp.

At block 1020, the big data appliance generates aggregate process control data from the plurality of records. The big data appliance may aggregate the plurality of records according to at least one statistical parameter associated with each of the plurality of records. For example, the at least one statistical parameter may be one or more of: a high value of the respective one or more measurement values, a low value of the respective one or more measurement values, a most recent value of the respective one or more measurement values, a standard deviation of the respective one or more measurement values, an average of the respective one or more measurement values, and a median of the respective one or more measurement values. The big data appliance may also calculate the at least one statistical parameter from the plurality of records, such as in cases in which the at least one statistical parameter is not explicitly indicated in the aggregate process control data. For example, the big data appliance may calculate averages, standard deviations, high values, low values and/or other metrics to generate the aggregate process control data. In some cases, a user may specify a desired statistical parameter, for example as part of a request or command, whereby the big data appliance calculates the appropriate statistical parameter from the plurality of records.

At block 1025, the big data appliance presents the aggregate process control data to the user. For example, the big data appliance may present the aggregate process control data as numeric data, a chart, a graph, or any other type of numeric data or graphical indication. Further, the aggregate process control data may indicate any statistical parameters that are identified or calculated from the plurality of records.

At block 1030, the big data appliance determines if an additional request is received. For example, the user may wish to narrow or expand the aggregated process control data, or may wish to perform other calculations on the process control data. If the additional request is received ("YES"), processing can return to 1010 or proceed to any other functionality. If the additional request is not received ("NO"), processing can end, repeat, or proceed to any other functionality.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method of accessing process control data associated with a process control plant, the method comprising:
receiving a request from a user to retrieve a portion of process control data stored in a data storage device, the process control data corresponding to at least one process that is controlled by a plurality of devices in the process control plant, wherein the request indicates a set period of time;
retrieving, from the data storage device, the portion of the process control data corresponding to the set period of time, the portion of the process control data including a plurality of records, each record of the plurality of records having (1) a respective process variable, (2) a measurement value associated with the respective process variable, and (3) a respective remainder portion of a respective timestamp that falls within the set period of time, the respective timestamp including a respective rounded timestamp portion and the respective remainder timestamp portion, and the each record accessed via a rowkey, wherein the rowkey includes (i) an indication of the respective process variable and (ii) an indication of the respective rounded timestamp portion of the respective timestamp;
generating, by a processor, aggregate process control data from the plurality of records; and
presenting the aggregate process control data to the user.

2. The method of claim 1, wherein generating the aggregate process control data comprises:
arranging the plurality of records according to at least one statistical parameter associated with the each record of the plurality of records.

3. The method of claim 1, wherein generating the aggregate process control data comprises:
calculating at least one statistical parameter from the plurality of records, wherein the aggregate process control data indicates the at least one statistical parameter.

4. The method of claim 1, wherein generating the aggregate process control data comprises:
receiving a selection of at least one statistical parameter from the user; and
generating the aggregate process control data to indicate the at least one statistical parameter.

5. The method of claim 1, further comprising:
receiving an additional request from the user to modify the aggregate process control data, the additional request indicating an additional set period of time occurring within the set period of time;
identifying a portion of the plurality of records that falls outside of the additional set period of time;
modifying the aggregate process control data by removing the portion of the plurality of records that falls outside of the additional set period of time; and
presenting the modified aggregate process control data to the user.

6. The method of claim 1, further comprising:
receiving an additional request from the user to modify the aggregate process control data, the additional request indicating an additional set period of time at least partly occurring outside the set period of time;
retrieving, from the data storage device, an additional portion of the process control data corresponding to the additional set period of time, the additional portion of the process control data including a plurality of additional records;
modifying the aggregate process control data by adding the plurality of additional records; and
presenting the modified aggregate process control data to the user.

7. The method of claim 1, wherein generating the aggregate process control data comprises:
generating aggregate process control data from the plurality of records having the same respective process variable.

8. A system of accessing process control data associated with a process control plant, comprising:
one or more data storage devices configured to store process control data corresponding to at least one process that is controlled by a plurality of devices in the process control plant;
a user interface adapted to receive a request from a user to retrieve a portion of the process control data, wherein the request indicates a set period of time; and
one or more processors adapted to interface with the one or more data storage devices and the user interface and configured to:
retrieve, from the one or more data storage devices, the portion of the process control data corresponding to the set period of time, the portion of the process control data including a plurality of records, each record of the plurality of records having (1) a respective process variable, (2) a measurement value associated with the respective process variable, and (3) a respective remainder portion of a respective timestamp that falls within the set period of time, the respective timestamp including a respective rounded timestamp portion and the respective remainder timestamp portion, and the each record accessed based on a rowkey, wherein the rowkey includes (i) an indication of the respective process variable and (ii) an indication of the respective rounded timestamp portion of the respective timestamp;
generate aggregate process control data from the plurality of records; and
cause the user interface to present the aggregate process control data to the user.

9. The system of claim 8, wherein the one or more processors generate the aggregate process control data by:
arranging the plurality of records according to at least one statistical parameter associated with the each record of the plurality of records.

10. The system of claim 8, wherein the one or more processors generate the aggregate process control data by:
calculating at least one statistical parameter from the plurality of records, wherein the aggregate process control data indicates the at least one statistical parameter.

11. The system of claim 8, wherein the one or more processors generate the aggregate process control data by:
receiving, from the user via the user interface, a selection for at least one desired statistical parameter, and
generating the aggregate process control data to indicate the at least one statistical parameter.

12. The system of claim 8, wherein the user interface is further adapted to receive an additional request from the user to modify the aggregate process control data, the additional request indicating an additional set period of time occurring within the set period of time; and wherein the one or more processors are further configured to:

identify a portion of the plurality of records that falls outside of the additional set period of time, modify the aggregate process control data by removing the portion of the plurality of records that falls outside of the additional set period of time, and cause the user interface to present the modified aggregate process control data to the user.

13. The system of claim 8, wherein the user interface is further adapted to receive an additional request from the user to modify the aggregate process control data, the additional request indicating an additional set period of time at least partly occurring outside the set period of time; and wherein the one or more processors are further configured to:

retrieve, from the one or more data storage devices, an additional portion of the process control data corresponding to the additional set period of time, the additional portion of the process control data including a plurality of additional records, modify the aggregate process control data by adding the plurality of additional records, and cause the user interface to present the modified aggregate process control data to the user.

14. The system of claim 8, wherein the one or more processors generate the aggregate process control data by:

generating aggregate process control data from the plurality of records having the same respective process variable.

15. A process control system, comprising:

a controller configured to control a process in the process control system;

a field device communicatively connected to the controller, the field device configured to perform a physical function to control the process in the process control system, and the field device configured to transmit to or receive from the controller real-time data corresponding to the physical function; and a process control system big data apparatus, the process control system big data apparatus including:

one or more data storage devices configured to store the real-time data, a user interface adapted to receive a request from a user to retrieve a portion of the real-time data, wherein the request indicates a set period of time, and one or more processors adapted to interface with the one or more data storage devices and the user interface and configured to:

retrieve, from the one or more data storage devices the portion of the process control data corresponding to the set period of time, the portion of the process control data including a plurality of records, each record of the plurality of records having (1) a respective process variable, (2) a measurement value associated with the respective process variable, and (3) a respective remainder portion of a respective timestamp that falls within the set period of time, the respective timestamp including a respective rounded timestamp portion and the respective remainder timestamp portion, and the each record accessed via a rowkey, wherein the rowkey includes (i) an indication of the respective process variable and (ii) an indication of the respective rounded timestamp portion of the respective timestamp;

generate aggregate process control data from the plurality of records; and cause the user interface to present the aggregate process control data to the user;

wherein the controller is a first node of a process control system big data network, and the process control system big data apparatus is a second node of the process control system big data network.

16. The process control system of claim 15, wherein the one or more processors generate the aggregate process control data by:

arranging the plurality of records according to at least one statistical parameter associated with the each record of the plurality of records.

17. The process control system of claim 15, wherein the one or more processors generate the aggregate process control data by:

calculating at least one statistical parameter from the plurality of records, wherein the aggregate process control data indicates the at least one statistical parameter.

18. The process control system of claim 15, wherein the user interface is further adapted to receive an additional request from the user to modify the aggregate process control data, the additional request indicating an additional set period of time occurring within the set period of time; and wherein the one or more processors are further configured to:

identify a portion of the plurality of records that falls outside of the additional set period of time, modify the aggregate process control data by removing the portion of the plurality of records that falls outside of the additional set period of time, and cause the user interface to present the modified aggregate process control data to the user.

19. The process control system of claim 15, wherein the user interface is further adapted to receive an additional request from the user to modify the aggregate process control data, the additional request indicating an additional set period of time at least partly occurring outside the set period of time; and wherein the one or more processors are further configured to:

retrieve, from the data storage device, an additional portion of the process control data corresponding to the additional set period of time, the additional portion of the process control data including a plurality of additional records, modify the aggregate process control data by adding the plurality of additional records, and cause the user interface to present the modified aggregate process control data to the user.

20. The process control system of claim 15, wherein the one or more processors generate the aggregate process control data by:

generating aggregate process control data from the plurality of records having the same respective process variable.

* * * * *